US012013735B2

(12) United States Patent
Jung et al.

(10) Patent No.: US 12,013,735 B2
(45) Date of Patent: Jun. 18, 2024

(54) ELECTRONIC DEVICE, METHOD OF CONTROLLING CHARGING BY ELECTRONIC DEVICE, AND METHOD OF SUPPLYING POWER BY POWER SUPPLY DEVICE

(71) Applicant: Samsung Electronics Co., Ltd., Suwon-si (KR)

(72) Inventors: Kuchul Jung, Seoul (KR); Sunggeun Yoon, Hwaseong-si (KR); Kisun Lee, Hwaseong-si (KR); Hoyoung Lee, Seoul (KR); Seyoung Jang, Seongnam-si (KR); Hyemi Yu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/178,312

(22) Filed: Mar. 3, 2023

(65) Prior Publication Data

US 2023/0205290 A1    Jun. 29, 2023

Related U.S. Application Data

(63) Continuation of application No. 17/341,887, filed on Jun. 8, 2021, now Pat. No. 11,599,172, which is a (Continued)

(30) Foreign Application Priority Data

Sep. 2, 2014    (KR) .................. 10-2014-0116434

(51) Int. Cl.
*G06F 1/26*    (2006.01)
*G06F 1/28*    (2006.01)
(Continued)

(52) U.S. Cl.
CPC ............. *G06F 1/26* (2013.01); *G06F 1/263* (2013.01); *G06F 1/28* (2013.01); *G06F 1/305* (2013.01);
(Continued)

(58) Field of Classification Search
USPC ....................................... 320/162
See application file for complete search history.

(56) References Cited

U.S. PATENT DOCUMENTS 7,541,779 B2    6/2009  Takenaka
8,264,198 B2    9/2012  Sato et al.
(Continued)

FOREIGN PATENT DOCUMENTS

CA    2 635 338 A1    12/2009
CN    1557043 A    12/2004
(Continued)

OTHER PUBLICATIONS

"Battery Charging Specification, Revision 1.2", Mar. 15, 2012.
(Continued)

*Primary Examiner* — Mohammed Alam
(74) *Attorney, Agent, or Firm* — Jefferson IP Law, LLP

(57) ABSTRACT

An electronic device is provided. The electronic device includes a housing, a battery included within the housing, a connector electrically connected to an external power supply device including an integrated circuit (IC) and exposed to a part of the housing, and a power management unit included within the housing and electrically connected to the connector, wherein the power management unit is configured to communicate with the IC of the external power supply device, and wherein the connector is configured to receive a first current of a first current value during at least a part of the communication and to receive a second current of a second current value greater than the first current value (Continued)

during at least a part in which the communication is not performed.

18 Claims, 12 Drawing Sheets

Related U.S. Application Data continuation of application No. 16/797,688, filed on Feb. 21, 2020, now Pat. No. 11,050,286, which is a continuation of application No. 14/842,212, filed on Sep. 1, 2015, now Pat. No. 10,574,074.

(51) Int. Cl.
*G06F 1/30* (2006.01)
*H02J 7/00* (2006.01)

(52) U.S. Cl.
CPC ............ *H02J 7/00* (2013.01); *H02J 7/00034* (2020.01); *H02J 7/00036* (2020.01); *H02J 7/0047* (2013.01); *H02J 7/007* (2013.01); *H02J 7/00045* (2020.01); *H02J 7/0048* (2020.01)

(56) References Cited

U.S. PATENT DOCUMENTS

| | | | |
|---|---|---|---|
| 8,284,067 B2 | 10/2012 | Yasuda et al. | |
| 9,045,048 B2 | 6/2015 | Yukizane et al. | |
| 10,256,652 B2 | 4/2019 | Zhang et al. | |
| 2001/0054878 A1 | 12/2001 | Odaohhara | |
| 2003/0172312 A1 | 9/2003 | Takahashi et al. | |
| 2005/0237030 A1 | 10/2005 | Takenaka | |
| 2006/0061330 A1* | 3/2006 | Sato | H02J 7/0048 320/125 |
| 2007/0241721 A1 | 10/2007 | Weinstein et al. | |
| 2008/0222431 A1 | 9/2008 | Paniagua et al. | |
| 2008/0315846 A1 | 12/2008 | Sato et al. | |
| 2009/0075704 A1 | 3/2009 | Wang | |
| 2010/0102778 A1 | 4/2010 | Otsu et al. | |
| 2010/0151808 A1 | 6/2010 | Toncich et al. | |
| 2010/0289457 A1 | 11/2010 | Onnerud et al. | |
| 2011/0037428 A1 | 2/2011 | Sakaguchi et al. | |
| 2011/0121654 A1 | 5/2011 | Recker et al. | |
| 2011/0121779 A1 | 5/2011 | Ichikawa et al. | |
| 2012/0087078 A1 | 4/2012 | Medica et al. | |
| 2012/0215468 A1 | 8/2012 | Geris et al. | |
| 2013/0009599 A1 | 1/2013 | Yukizane et al. | |
| 2013/0063076 A1 | 3/2013 | Shen | |
| 2013/0076637 A1 | 3/2013 | Teltz | |
| 2013/0141034 A1* | 6/2013 | Huang | H02J 7/00714 320/137 |
| 2013/0207598 A1 | 8/2013 | Teltz et al. | |
| 2013/0270920 A1 | 10/2013 | Yoon et al. | |
| 2013/0290746 A1 | 10/2013 | Lee et al. | |
| 2013/0307473 A1 | 11/2013 | Han et al. | |
| 2014/0009113 A1 | 1/2014 | Robins et al. | |
| 2014/0009120 A1 | 1/2014 | Kim | |
| 2014/0207977 A1 | 7/2014 | Hang et al. | |
| 2014/0333257 A1 | 11/2014 | Akiyoshi et al. | |
| 2015/0022141 A1 | 1/2015 | Oku | |
| 2015/0035477 A1 | 2/2015 | Wong et al. | |
| 2015/0088253 A1 | 3/2015 | Doll et al. | |
| 2015/0180244 A1 | 6/2015 | Jung et al. | |
| 2015/0188346 A1 | 7/2015 | Oku | |
| 2015/0194839 A1 | 7/2015 | Wojcik et al. | |
| 2015/0198640 A1 | 7/2015 | Lee | |
| 2015/0236528 A1 | 8/2015 | Kim et al. | |
| 2015/0303704 A1 | 10/2015 | Juan | |
| 2016/0064959 A1* | 3/2016 | Jung | G06F 1/305 |
| 2016/0313270 A1 | 10/2016 | Connell et al. | |
| 2016/0344227 A1 | 11/2016 | Zhang et al. | |
| 2017/0250557 A1 | 8/2017 | Zhang et al. | |
| 2021/0296909 A1* | 9/2021 | Jung | H02J 7/00034 |

FOREIGN PATENT DOCUMENTS

| | | | | |
|---|---|---|---|---|
| CN | 1617620 A | 5/2005 | | |
| CN | 1691459 A | 11/2005 | | |
| CN | 101727269 A | 6/2010 | | |
| CN | 101867216 A | * 10/2010 | ............... | H02J 7/32 |
| CN | 101997253 A | 3/2011 | | |
| CN | 102422504 A | 4/2012 | | |
| CN | 102427260 A | 4/2012 | | |
| CN | 102427260 A | * 4/2012 | .............. | H02J 7/045 |
| CN | 102957193 A | 3/2013 | | |
| CN | 103106167 A | 5/2013 | | |
| CN | 103532211 A | 1/2014 | | |
| CN | 103779907 A | 5/2014 | | |
| CN | 203747454 U | 7/2014 | | |
| CN | 104124483 A | 10/2014 | | |
| EP | 1 691 252 A1 | 8/2006 | | |
| EP | 2 887 492 A2 | 6/2015 | | |
| JP | H1123678 A | 1/1999 | | |
| JP | 2003-263245 A | 9/2003 | | |
| JP | 2008-206259 A | 9/2008 | | |
| JP | 2010035277 A | 2/2010 | | |
| JP | 2011-509466 A | 3/2011 | | |
| JP | 2014-158312 A | 8/2014 | | |
| JP | 2014-158407 A | 8/2014 | | |
| KR | 10-2005-0046456 A | 5/2005 | | |
| KR | 10-2013-0080518 A | 7/2013 | | |
| KR | 10-2013-0120229 A | 11/2013 | | |
| KR | 10-2014-0007194 A | 1/2014 | | |
| KR | 10-2016-0135710 A | 11/2016 | | |
| WO | 2010/060062 A1 | 5/2010 | | |
| WO | 2011/118187 A1 | 9/2011 | | |
| WO | 2014/075498 A1 | 5/2014 | | |
| WO | 2014/097640 A1 | 6/2014 | | |

OTHER PUBLICATIONS

"Universal Serial Bus Power Delivery Specification", Revision 1.0.
Len Sherman, "The Basics of USB Battery Charging: A Survival Guide", Maxim Integrated, Dec. 9, 2010.
Mohammed Ismail, "USB Battery Charging Revision and the Role of Adapter Emulators", USB Power Technology.
Chinese Office Action dated Jul. 2, 2019, issued in the Chinese Application No. 201580047122.9.
Chinese Office Action dated Apr. 2, 2020, issued in Chinese Application No. 201580047122.9.
Indian Office Action dated Dec. 28, 2020, issued in Indian Application No. 202018025733.
Korean Office Action dated Jan. 7, 2021, issued in Korean Application No. 10-2014-0116434.
Chinese Office Action dated Sep. 24, 2021, issued in Chinese Application No. 202011578295.2.
Chinese Office Action dated Oct. 9, 2021, issued in Chinese Application No. 202011578655.9.
European Search Report dated Oct. 29, 2021, issued in European Application No. 21187049.8.
Korean Decision to Grant a Patent dated May 4, 2022, issued in Korean Application No. 10-2021-0144920.
Chinese Notification of Reexamination dated Jan. 9, 2023, issued in Chinese Application No. 202011578655.9.
Chinese Office Action dated Mar. 31, 2023, issued in a Chinese Application No. 202011578655.9.
Extended European Search Report dated Jan. 2, 2024, issued in European Paten Application No. 23177525.5.
Indian Office Action dated Feb. 6, 2024, issued in Indian Patent Application No. 202018025733.

* cited by examiner

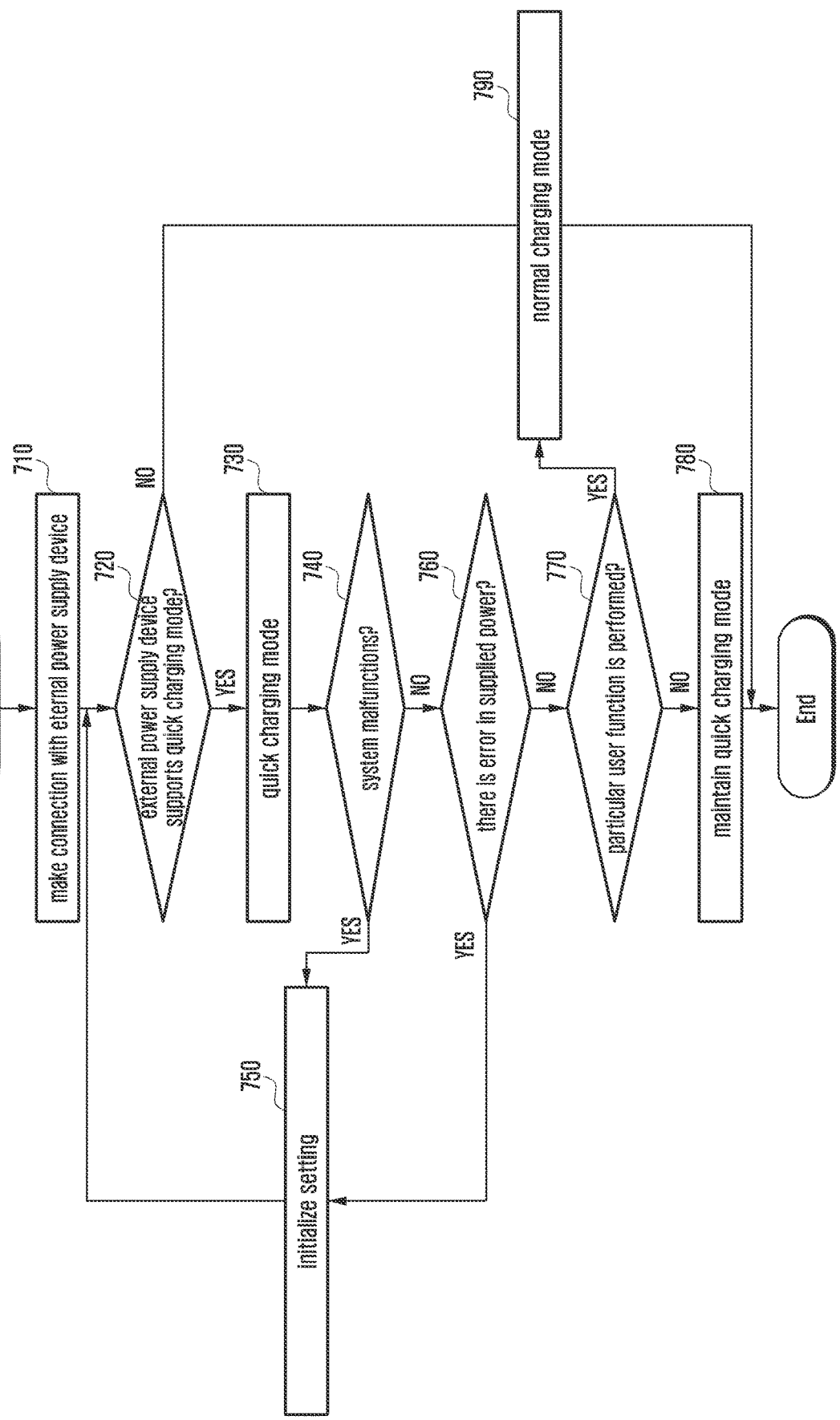

ELECTRONIC DEVICE, METHOD OF CONTROLLING CHARGING BY ELECTRONIC DEVICE, AND METHOD OF SUPPLYING POWER BY POWER SUPPLY DEVICE

CROSS-REFERENCE TO RELATED APPLICATION(S)

This application is a continuation application of prior application Ser. No. 17/341,887, filed on Jun. 8, 2021, which has issued as U.S. Pat. No. 11,599,172 on Mar. 7, 2023, which is a continuation application of prior application Ser. No. 16/797,688, filed on Feb. 21, 2020, which has issued as U.S. Pat. No. 11,050,286 on Jun. 29, 2021, which is a continuation application of prior application Ser. No. 14/842,212, filed on Sep. 1, 2015, which has issued as U.S. Pat. No. 10,574,074 on Feb. 25, 2020 and is based on and claims priority under 35 U.S.C. § 119(a) of a Korean patent application filed on Sep. 2, 2014 in the Korean Intellectual Property Office and assigned Serial number 10-2014-0116434, the disclosure of which is incorporated by reference herein in its entirety.

TECHNICAL FIELD

The present disclosure relates to an electronic device for preventing damage from malfunction or heat generated during charging of the electronic device, a charging control method of an electronic device, a power supply device, and power supply method of a power supply device.

BACKGROUND

Generally, electronic devices, such as smart phones, tablet personal computers (PCs), portable multimedia players (PMPs), personal digital assistants (PDAs), laptop PCs, and wearable devices, for example, wrist watches, head-mounted displays (HMDs), and the like, may perform not only a phone call function, but also various other functions (for example, games, social network services (SNS), internet, multimedia, and taking and displaying a picture or a video). As electronic devices continue to increase various functions, the power consumption by a processor also increases. Accordingly, the need of a charging technology to reduce the battery charging time has increased.

Therefore, a need exists for an electronic device, a charging control method of an electronic device, a power supply device, and a power supply method of a power supply device for preventing functionality issues, such as a malfunction of the electronic device, which may be generated when high power is supplied to the electronic device to quickly charge the electronic device, electromagnetic interference (EMI), and a communication connection failure.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device, a charging control method of an electronic device, a power supply device, and a power supply method of a power supply device for preventing functionality issues, such as a malfunction of the electronic device, which may be generated when high power is supplied to the electronic device to quickly charge the electronic device, electromagnetic interference (EMI), and a communication connection failure.

Another aspect of the present disclosure is to provide an electronic device, a charging control method of an electronic device, a power supply device, and a power supply method of a power supply device for preventing functionality issues, such as an infrared (IR) drop in which a voltage drop occurs in proportion to a current flowing due to a communication error or resistance of a connection line by restricting a current received during communication between the electronic device and an external power supply device.

In accordance with an aspect of the present disclosure, an electronic device is provided. The electronic device includes a housing, a battery included within the housing, a connector electrically connected to an external power supply device including an integrated circuit (IC) and exposed to a part of the housing, and a power management unit included within the housing and electrically connected to the connector. The power management unit may be configured to communicate with the IC of the external power supply device. The connector may be configured to receive a first current of a first current value during at least a part of the communication and receive a second current of a second current value greater than the first current value during at least a part in which the communication is not performed.

In accordance with another aspect of the present disclosure, method of controlling charging by an electronic device is provided. The method includes detecting a connection with the external power supply device, performing communication with the external power supply device, and receiving power from the external power supply device based on a result of the communication and charging the battery. The method may include receiving a first current of a first current value during at least a part of the communication and receiving a second current of a second current value greater than the first current value during at least a part in which the communication is not performed.

In accordance with another aspect of the present disclosure, a power supply device is provided. The power supply device includes an interface configured to supply power to an external electronic device, the interface being connected to the external electronic device and a charging supply control module configured to communicate with the external electronic device, make a control to supply a first current of a first current value to the external electronic device during at least a part of the communication, and make a control to supply a second current of a second current value greater than the first current value to the external electronic device during at least a part in which the communication is not performed.

In accordance with another aspect of the present disclosure, a method of supplying power is provided. The method includes receiving a charging power value from an external electronic device, transmitting an acknowledge message to the external electronic device, and supplying power corresponding to the charging power value to the external electronic device. The method may include supplying a first current of a first current value to the external electronic device during at least a part of communication with the external electronic device and supplying a second current of a second current value greater than the first current value to the external electronic device during at least a part in which the communication is not performed.

According to an electronic device, a charging control method of an electronic device, a power supply device, and a power supply method of a power supply device according to various embodiments of the present disclosure, a quick charging mode or a normal charging mode is selected and a battery can be charged based on the selected mode.

According to an electronic device, a charging control method of an electronic device, a power supply device, and a power supply method of a power supply device according to various embodiments of the present disclosure, a communication malfunction between an external power supply device and the electronic device, which may be generated during the charging, can be prevented.

According to an electronic device, a charging control method of an electronic device, a power supply device, and a power supply method of a power supply device according to various embodiments of the present disclosure, EMI, which may be generated during the charging, can be prevented.

According to an electronic device, a charging control method of an electronic device, a power supply device, and a power supply method of a power supply device according to various embodiments of the present disclosure, when communication between the external power supply device and the electronic device is disconnected due to an abnormal operation during the charging, the communication can be automatically connected.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 is a flowchart illustrating a charging control method of an electronic device according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the accompanying drawings, some components may be exaggerated, omitted, or schematically illustrated, and a size of each component may not precisely reflect the actual size thereof. Accordingly, various embodiments of the present disclosure are not restricted by the relative sizes or intervals of elements illustrated in the accompanying drawings.

Further, the term "and" used in the present specification should be understood as including any and all combinations of at least one of the associated listed items.

In addition, the terms, such as "unit", "module", and the like, indicate a unit for processing at least a function or an operation, and may be embodied through hardware, software, or a combination hardware and software.

Figure 1:
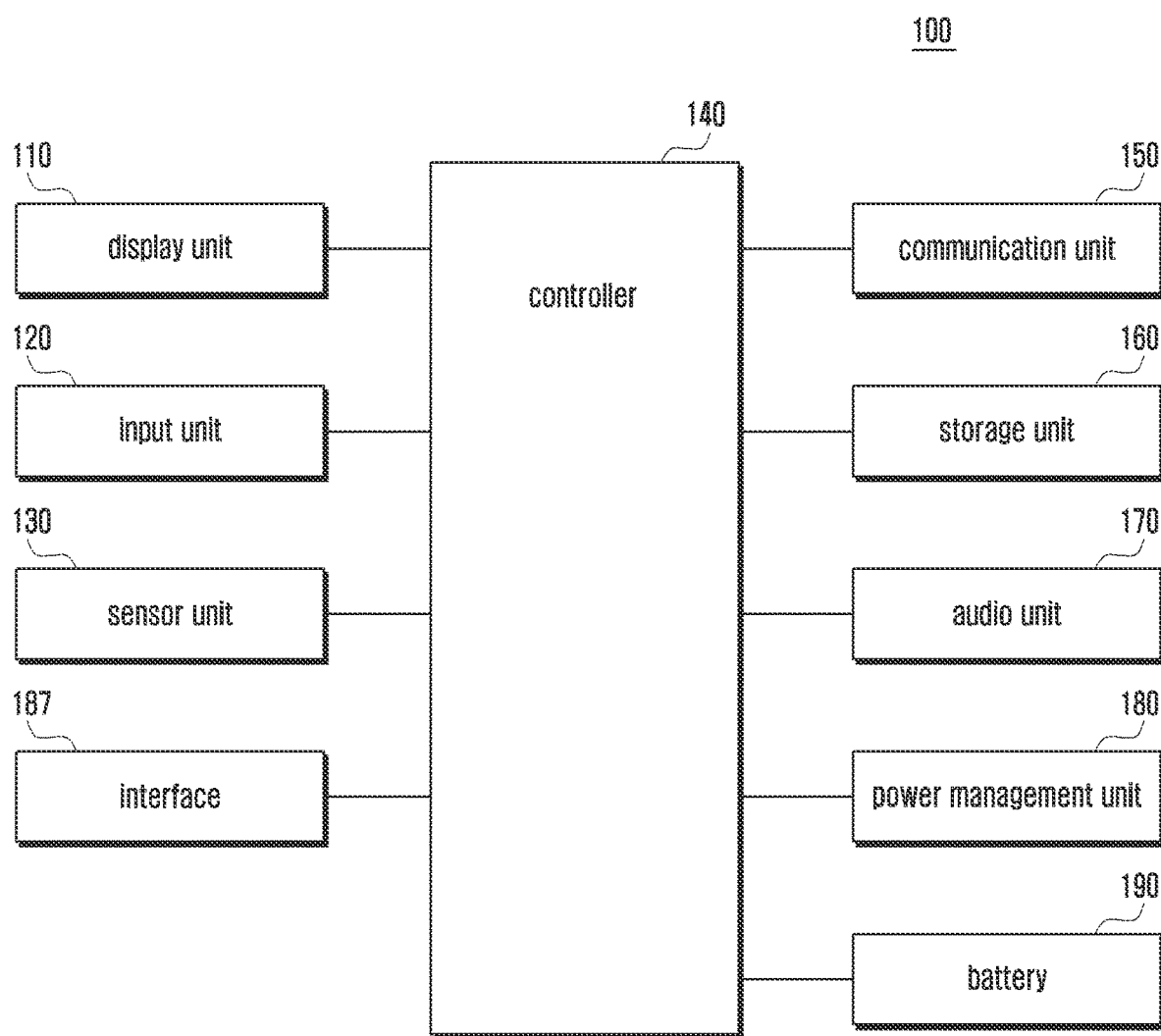
FIG. 1 is a block diagram of an electronic device according to an embodiment of the present disclosure.

FIG. 1 is a block diagram of an electronic device according to various embodiments of the present disclosure.

Referring to FIG. 1, an electronic device 100 may include a display unit 110, an input unit 120, a sensor unit 130, a controller 140, a communication unit 150, a storage unit 160, an audio unit 170, a power management unit 180, an interface 187, and a battery 190. According to an embodiment of the present disclosure, the electronic device 100 may include the above components within the housing. The electronic device 100 may be connected to an external power supply device and may include a connector exposed to a part of the housing. The connector may be connected to the interface 187.

The display unit 110 may display various screens (for example, a media content reproduction screen, a screen for an outgoing call, a messenger screen, a game screen, a gallery screen, and the like) according to the operation of the electronic device 100 by the user.

The display unit 110 may display (output) information processed by the electronic device 100. For example, when the electronic device 100 is in a call mode, the display unit 131 may display a call related user interface (UI) or graphical user interface (GUI). Further, the display unit 110 may display a video call mode, a photographed or/and received image, or a UI or GUI. The display unit 110 may support a display in a landscape or portrait mode depending on an orientation of the electronic device 100 (or a direction in which the electronic device is placed) and a screen switching display depending on a change between the landscape and portrait modes.

The display unit 110 may include at least one of a liquid crystal display (LCD), a thin film transistor-LCD (TFT-LCD), a light emitting diode (LED), an organic LED (OLED), an active matrix OLED (AMOLED), a flexible display, a bended display, and a three dimensional (3D) display. Some of the displays may be implemented in a transparent display configured in a transparent or phototransparent type such that the outside can be viewed therethrough.

According to an embodiment of the present disclosure, the display 110 may display a user interface indicating a charging mode while the electronic device 100 (for example, the battery 190 of the electronic device 100) is charged. For example, the electronic device 100 may display a symbol, a figure an icon, or a drawing, which indicates that the battery 190 is being charged, or a text, a phrase, or a figure, which indicates a charging mode. The display unit 110 may display another user interface (for example, a screen showing the charging) indicating the charging mode according to whether the electronic device 100 is turned on. When the electronic device 100 is turned off, the display unit 110 may display a dynamic user interface. According to an embodiment of the present disclosure, the display unit 110 may display a movable user interface showing different speeds or different amounts (or ranges) depending on the charging mode.

The input unit 120 may receive an input for controlling the electronic device 100 from the user. The input unit 120 may receive a touch input from the user. The input unit 120 may include a touch panel. The touch panel may recognize a touch input based on at least one of, for example, a capacitive type, a resistive type, an infrared (IR) type, and an ultrasonic type. Further, the touch pad may further include a control circuit. In the case of the capacitive type, physical contact or proximity recognition is possible. The touch panel may further include a tactile layer. The touch panel may provide the user with a tactile reaction. The input unit 120 may transmit an input signal according to the received touch input to the controller 140.

The input unit 120 may include a (digital) pen sensor, a key, or an ultrasonic input device. The (digital) pen sensor may be implemented, for example, using a method identical or similar to receiving a user's touch input or using a separate recognition sheet. The key may include, for example, a physical button, an optical key, or a keypad. The ultrasonic input device is a device which may detect an acoustic wave by a microphone of the electronic device 100 through an input device generating an ultrasonic signal to identify data and may perform wireless recognition.

According to various embodiments of the present disclosure, the display unit 110 and the input unit 120 may be integrally implemented. For example, the electronic device 100 may include a touch screen. The touch screen may simultaneously perform an input function and a display function. The touch screen may be formed in a structure in which a touch panel and a display panel are accumulated. The touch screen may include an input/output device. The touch screen may detect a user's touch event input (for example, a touch based long press input, a touch based short press input, a single touch based input, a multi-touch based input, a touch based gesture (for example, a drag) input, and the like) contacting a surface of the touch screen. When the touch screen detects a user's touch event on the surface of the touch screen, the touch screen may detect a coordinate where the touch event is generated and transmit the detected coordinate to the controller 140.

The touch screen may be configured to convert a pressure applied to a particular part of the surface of the touch screen or a change in capacitance generated in a particular part into an electrical input signal. The touch screen may be configured to detect a touch pressure according to an applied touch type as well as a touched position and a touched area. When there is a touch input on the touch screen, a signal (signals) corresponding to the touch input may be transferred to a touch controller (not illustrated). The touch controller (not illustrated) may process the signal (signals), and then transfer corresponding data to the controller 140.

According to various embodiments of the present disclosure, the input unit 120 may receive a mode selection input for selecting a charging mode from the user. According to an embodiment of the present disclosure, the input unit 120 may receive a user input for selecting whether to activate a quick charging function from the user. For example, the input unit 120 may receive a user input for selecting on or off of the quick charging mode from the user. The input unit 120 may transmit the received mode selection input to the controller 140 (or the power management unit 180).

The sensor unit 130 may measure a physical quantity or detect an operating state of the electronic device 100, and convert the measured or detected information into an electrical signal. The sensor unit 130 may include at least one of, for example, a gesture sensor, a gyro sensor, an atmospheric pressure sensor, a magnetic sensor, an acceleration sensor, a grip sensor, a proximity sensor, a color sensor (for example, a red, green, and blue (RGB) sensor), a bio sensor, a temperature/humidity sensor, an illumination sensor, and ultraviolet (UV) sensor. Additionally or alternatively, the sensor unit 130 may include an E-nose sensor, an electromyography (EMG) sensor, an electroencephalogram (EEG) sensor, an electrocardiogram (ECG) sensor, an IR sensor, an iris sensor, a fingerprint sensor, and a geomagnetic sensor. The sensor unit 130 may further include a control circuit for controlling at least one sensor included therein.

According to various embodiments of the present disclosure, the sensor unit 130 may measure a temperature of components of the electronic device 100 (for example, the display unit 110, the input unit 120, the sensor unit 130, the controller 140, the communication unit 150, the storage unit 160, or the battery 190) by using a temperature sensor. According to an embodiment of the present disclosure, the sensor unit 130 may measure a surface temperature of the electronic device 100 and temperatures of internal components such as the battery 190 and the connector while the battery 190 is charged. The sensor unit 130 may transmit the measured temperature to the controller 140 or the power management unit 180.

The controller 140 may control a plurality of hardware components (for example, the display unit 110, the input unit 120, the sensor unit 130, the communication unit 150, and the storage unit 160) or software components by driving an operating system or an application program, and may perform processing of various types of data including multimedia data and calculations. The controller 140 may be implemented by, for example, a system on chip (SoC). According to an embodiment of the present disclosure, the controller 140 may further include a graphical processing unit (GPU, not illustrated). According to an embodiment of the present disclosure, the controller 140 may be an application processor (AP) or a communication processor (CP). According to an embodiment of the present disclosure, the controller 140 may receive commands from other components through a bus, analyze the received commands, and perform calculations or data processing according to the analyzed commands.

According to an embodiment of the present disclosure, the controller 140 may control power input into/output from the battery 190 or the electronic device 100 by controlling the power management unit 180 or the interface 187.

The communication unit 150 may support a wireless communication function of the electronic device 100, and may be configured as a mobile communication module when the electronic device 100 supports a mobile communication function. The communication unit 150 may include a radio frequency (RF) transmitter for up-converting and amplifying a frequency of a transmitted wireless signal and an RF receiver for low-noise amplifying a received wireless signal and down-converting a frequency. Further, when the electronic device 100 supports a short-range wireless communication function, such as Wi-Fi communication, Bluetooth communication, Zigbee communication, ultra wideband (UWB) communication, and near field communication (NFC), the communication unit 150 may include a Wi-Fi communication module, a Bluetooth communication module, a Zigbee communication module, a UWB communication module, and a NFC communication module.

According to various embodiments of the present disclosure, the communication unit 150 may perform wired or wireless communication with an external power supply device under a control of the controller 140 (or the power management unit 180). For example, the communication unit 150 may transmit, to the external power supply device, a charging power value of the power to be supplied (for example, a charging current value or a charging voltage value).

The storage unit 160 may store image data, voice data, data input from a camera, data for processing a calculation, an algorithm required for an operation of the electronic device 100, configuration data, and guide information, and may also temporarily store a processing result.

The storage unit 160 may include a volatile memory or a non-volatile memory. For example, the volatile memory may include a static random access memory (SRAM) and a dynamic RAM (DRAM), and the non-volatile memory may include a read only memory (ROM), a flash memory, a hard disk, a secure digital (SD) memory card, and a multimedia card (MMC).

The storage unit 160 may store commands or data received from or generated by the controller 140 or other components (for example, the display unit 110, the input unit 120, the sensor unit 130, and the communication unit 150).

The storage unit 160 may include programming modules, such as a kernel, middleware, an application programming interface (API), or applications. Each of the aforementioned programming modules may be formed of software, firmware, hardware, or a combination of at least two thereof.

The kernel may control or manage system resources (for example, the bus, the controller 140 or the storage unit 160) used for performing operations or functions implemented in the remaining other programming modules, the middleware, the API, or the applications. Further, the kernel may provide an interface that allows the middleware, the API, or the applications to access each component of the electronic device 100 and to control or manage the component.

The middleware may act as an intermediary so as to allow the API or the applications to communicate with and exchange data with the kernel. Further, in association with task requests received from the applications, the middleware may perform a control (for example, scheduling or load balancing) for the task request by using, for example, a method of assigning a priority by which the system resources (for example, the controller 140 or the storage unit 160) of the electronic device 100 can be used for at least one of the applications.

The API is an interface used by the application to control a function provided from the kernel or the middleware, and may include, for example, at least one interface or function (for example, a command) for a file control, a window control, image processing, a character control, and the like.

The audio unit 170 may bi-directionally convert a voice and an electrical signal. The audio unit 170 may include at least one of, for example, a speaker, a receiver, earphones, and a microphone to convert input or output voice data.

The power management unit 180 may manage power of the electronic device 100. The power management unit 180 may be electrically connected to the interface 187 and a connector which is connected to the interface 187. The power management unit 180 may perform communication with an integrated circuit (IC) of the external power supply device. The IC of the external power supply device may be a module for controlling power supply. For example, the power management unit 180 may communicate with an internal module of the external power supply device (for example, a charging supply control module 220). The power management module 180 may make a control to receive the current of a first current value from the external power supply device through the connector or the interface 187 during at least a part of the communication between the electronic device 100 and the external power supply device. The power management unit 180 may make a control to receive the current of a second current value, which is greater than the first current value, from the external power supply device during at least a part, in which the communication between the electronic device 100 and the external power supply device is not performed, through the connector or the interface 187. According to an embodiment of the present disclosure, after the electronic device 100 is connected to the external power supply device, the power management unit 180 may control the connector or the interface 187 to receive the current of a second current value from the external power supply device during a first period and to receive the current of a first current value during a second period after the first period. The power management unit 180 may make a control to receive the current of a third current value, which is greater than the first current value, from the external power supply device through the connector or the interface 187 during a third period after the second period. The third current value may be less than the second current value. For example, the power management unit 180 may control the connector or the interface 187 to receive the current of the second current value from the external power supply device during a first period after the electronic device 100 is connected to the external power supply device, to receive the current of the first current value, which is less than the second current value, during the second period in which the electronic device 100 communicates with the external power supply device, and to receive the current of the third current value, which is greater than the first current value and less than the second current value, during the third period in which power is supplied according to a charging mode after the communication.

According to an embodiment of the present disclosure, the power management unit 180 may detect impedance of an element inside the external power supply device after the electronic device 100 is connected to the external power supply device. The power management unit 180 may perform communication based on at least a part of the detected impedance. For example, the power management unit 180 may detect impedance of the module or the IC inside the external power supply device (for example, the charging supply control module 220). The power management unit 180 may perform the communication between the electronic device 100 and the external power supply device by transmitting/receiving a signal based on the detected impedance.

According to an embodiment of the present disclosure, the power management unit 180 may exchange information related to a voltage value and/or a certain current value required by the electronic device 100 with the IC of the external power supply device through communication.

According to an embodiment of the present disclosure, the power management unit 180 may include a charging control module 181 for configuring a charging mode with the external power supply device (for example, a quick charging mode or a normal charging mode) and controlling the charging of the electronic device 100 according to the charging mode, a power management module 183 for managing power input into/output to the battery, and an electromagnetic wave shield unit 185 for shielding noise generated by a power supply.

The power management unit 180 (for example, the power management module 183 of the power management unit 180) may include a power management IC (PMIC) and a charger IC. For example, the PMIC may be mounted within an integrated circuit or an SoC semiconductor. The charging methods may be classified into a wired charging method and a wireless charging method. The charger IC may charge a battery 190 and can prevent introduction of over-voltage or over-current from a charger. According to an embodiment of the present disclosure, the charger IC may include a charger IC for at least one of the wired charging method and the wireless charging method. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like, may be added. According to various embodiments of the present disclosure, the PMIC or the charger IC may include an electromagnetic wave shielding device for shielding an electromagnetic wave around the PMIC or the charger IC. For example, the PMIC or the charger IC may include a shield can in a frame form.

The power management unit 180 (for example, the charging control module 181 of the power management unit 180) may detect a connection with the external power supply device. For example, the power management unit 180 may receive power from the external power supply device, or detect the connection with the external power supply device when a particular signal is received. The power management unit 180 may determine whether the connected external device is a power supply device for supplying power or a device for another purpose based on the signal received from the connected external device.

The power management unit 180 may determine the type of the connected external power supply device. For example, the power management unit 180 may determine whether the external power supply device is a power supply device, which supports at least two charging modes, based on the signal received from the external power supply device. For example, the power management unit 180 may determine whether the connected external power supply device is a power supply device which supports a quick charging mode or a normal charging mode. The power management unit 180 may set the quick charging mode or the normal charging mode according to whether the external power supply device supports the quick charging.

The quick charging mode may be a mode in which the external power supply device supplies power to the electronic device 100 by using greater charging power. For example, in the quick charging mode, the electronic device 100 may prevent an IR drop while receiving greater power from the external power supply device by using a charging voltage (for example, 9 V) higher than the normal charging voltage (for example, 5V) and a charging current (for example, 1.67 A) lower than the normal charging current (for example, 1.8 A). For example, when the electronic device 100 is connected to the external power supply device through a connector or a connection wire to receive power, the IR drop corresponding to a voltage drop in proportion to the flowing current due to resistance of the connector or the connection wire through which the power is transferred may occur.

According to an embodiment of the present disclosure, the electronic device 100 receives, from the external power supply device, greater power by using the relatively greater charging voltage and less current compared to the normal charging, thereby preventing issues of the IR drop while receiving the greater power. The external power supply device, which supports the quick charging mode, may communicate with the electronic device 100. For example, the external power supply device may receive a charging current value, a charging voltage value, or a charging power value from the electronic device 100 and supply power corresponding thereto. The power management unit 180 may receive information on an identification (ID), type, or model of the external power supply device from the external power supply device connected to the electronic device 100. The power management unit 180 may determine whether the external power supply device supports the quick charging mode by using the received information. When the external power supply device supports the quick charging mode, the power management unit 180 may set the charging mode as the quick charging mode.

According to an embodiment of the present disclosure, the power management unit 180 (for example, the charging control module 181 of the power management unit 180) may set or change the charging mode according to the mode setting input received by the input unit 120. The power management unit 180 may activate or deactivate the quick charging mode according to the user input received by the input unit 120.

According to an embodiment of the present disclosure, the power management unit 180 may transmit a first charging power value for the quick charging to the external power supply device. In this case, when an acknowledge message is received from the external power supply device, the power management unit 180 may support the quick charging mode, determine that power corresponding to the first charging power value transmitted by the external power supply device can be supplied, and set the charging mode as the quick charging mode. For example, when the power management unit 180 transmits the first charting power value of 9 V and 1.67 A to the external power supply device, the power management unit 180 may receive a signal indicating the same value from the external power supply device as the acknowledge message. In this case, the power management unit 180 may determine that the external power supply device supports the quick charging mode through the acknowledge message and transmit the first charging power value to the external power supply device again. Accordingly, the battery is charged in the quick charging mode.

According to an embodiment of the present disclosure, the external power supply device may support only the quick charging mode of a particular voltage. The power management unit 180 may transmit the first charging power value including the particular voltage value for the quick charging to the external power supply device, and determine whether the external power supply device can supply power corresponding to a voltage value included in the first charging power value based on the acknowledge message received from the external power supply device.

The power management unit 180 may control power supplied through the interface 187 or power input into/output to the battery 190 based on the set charging mode.

The power management unit 180 may set a charging power value and transmit the set charging power value to the external power supply device. The power management unit 180 may make a control to transmit the charging power value through communication with the external power supply device and to receive power corresponding to the charging power value transmitted to the external power supply device. For example, the power management unit 180 may make a control to transmit a greater charging voltage value compared to the normal charging and thus to receive greater power corresponding to the charging voltage value from the external power supply device. The power management unit 180 may control the electronic device 100 to receive power corresponding to a relatively large first charging power value from the external power supply device in the quick charging mode and to receive power corresponding to a second charging power value less than the first charging power value in the normal charging mode. In this case, the power management unit 180 may determine whether power corresponding to the set charging power value is supplied from the external power supply device.

According to an embodiment of the present disclosure, the power management unit 180 may control the power received from the external power supply device to be equal to or less than a certain value while the electronic device 100 communicates with the external power supply device (for example, the electronic device 100 transmits/receives particular information (for example, the charging power value or information on the external power supply device) to/from the external power supply device. For example, the power management unit 180 may limit the voltage and current of the supplied power to a certain value while the electronic device 100 communicates with the external power supply device. For example, the power management unit 180 may limit the charging power supplied from the external power supply device from the first charging power value (for example, 9 V and 1.6 A) for the quick charging to the second charging power value (for example, 5 V and 1.8 A) less than the first charging power value while the electronic device 100 communicates with the external power supply device. For example, according to various embodiments of the present disclosure, it is possible to maintain a smooth communication state by limiting the current value to prevent the IR drop during the communication between the electronic device 100 and the external power supply device.

According to an embodiment of the present disclosure, when the power received from the external power supply device does not correspond to the preset and transmitted charging power value, the power management unit 180 may initialize and reset the charging mode. For example, when power, which does not correspond to the charging power value desired by the external power supply device, is supplied from the external power supply device in the quick charging mode, the power management unit 180 may initialize the charging mode and perform an operation for setting the charging mode again.

When the power supplied from the external power supply device does not correspond to the set and transmitted charging power value, the power management unit 180 may determine that there is an error in communication with the external power supply device or the system (for example, at least one of the components of the electronic device). According to an embodiment of the present disclosure, the power management unit 180 may force a positive line (D+ line) of the interface connected to the external power supply device to drop from high to low in order to perform re-communication with the external power supply device. In this case, the positive line and a negative line (D− line) of the interface short-circuit. Thereafter, an interrupt is removed and a communication state with the external power supply device may be initialized while the negative line temporarily becomes high and then operates in low.

According to an embodiment of the present disclosure, when the voltage of the external power supply device becomes less than a preset value, the power management unit 180 may initialize the charging mode and setting and reattempt the charging. When the voltage of the external power supply device becomes less than a preset value, the power management unit 180 may determine that the external power supply device is in an unstable state, and thus stop the charging and initialize and reset the charging mode.

According to an embodiment of the present disclosure, when power is supplied from the external power supply device, a fold-back phenomenon may occur in which the voltage of the VBUS switches to a second voltage less than a first voltage for the quick charging. In this case, the electronic device 100 may initialize and reset the charging mode.

According to an embodiment of the present disclosure, the power management unit 180 may determine whether a particular function of the electronic device 100 is performed in the quick charging mode. For example, the power management unit 180 may determine whether a call function, a message function, a game function, and a multimedia reproduction function are performed in the quick charging mode. When the particular function is performed, the power management unit 180 may change the charging mode from the quick charging mode to the normal charging mode. According to an embodiment of the present disclosure, when a particular user function is performed in the quick charging mode, the power management unit 180 may stop charging the battery 190 for a certain time. When the particular user function is performed in the quick charging mode, the power management unit 180 may limit a charging power value to a certain value or less while maintaining the charging mode. In another example, the power management unit 180 may determine whether the screen of the electronic device 100 is turned off. The power management unit 180 may make a control to conduct the quick charging only when the screen of the electronic device 100 is turned off.

According to an embodiment of the present disclosure, each component of the power management unit 180 (for example, the charging control module 181, the power management module 183, and the electromagnetic wave shield unit 185) may be configured as an individual module or as one combined module of the power management unit 180. According to an embodiment of the present disclosure, the power management unit 180 may operate in the electronic device 100 as a separate module which is not included in the controller 140. According to an embodiment of the present disclosure, the power management unit 180 may be configured as one module together with the controller 140 and perform a function of the controller 140 or the power management unit 180 together with the controller 140 or the power management unit 180.

The interface 187 may include, for example, a high-definition multimedia interface (HDMI), a universal serial bus (USB), an optical interface, or a D-subminiature (D-sub). The interface 187 may include, for example, a mobile high-definition link (MHL) interface, an SD card/MMC interface, or an infrared data association (IrDA) interface.

The interface 187 may be connected to the external power supply device, for example, a travel charger (a travel adapter (TA) or a travel charger (TC)) which converts alternating current (AC) power into direct current (DC) power. The interface 187 may be connected to an external wired or wireless charger. The interface 187 according to an embodiment of the present disclosure may have a separate interface standard which is distinguished from an interface standard (for example, a 20-pin interface, a micro USB interface, and the like) of the travel charger (hereinafter, referred to as a wired charger) generally used by a portable terminal of the related art. The interface 187 may supply power input from the external power supply device to the electronic device 100.

The battery 190 may store or generate electricity and may supply power to the electronic device 100 by using the stored or generated electricity. For example, the battery 190 may include a rechargeable battery or a solar battery.

Figure 2:
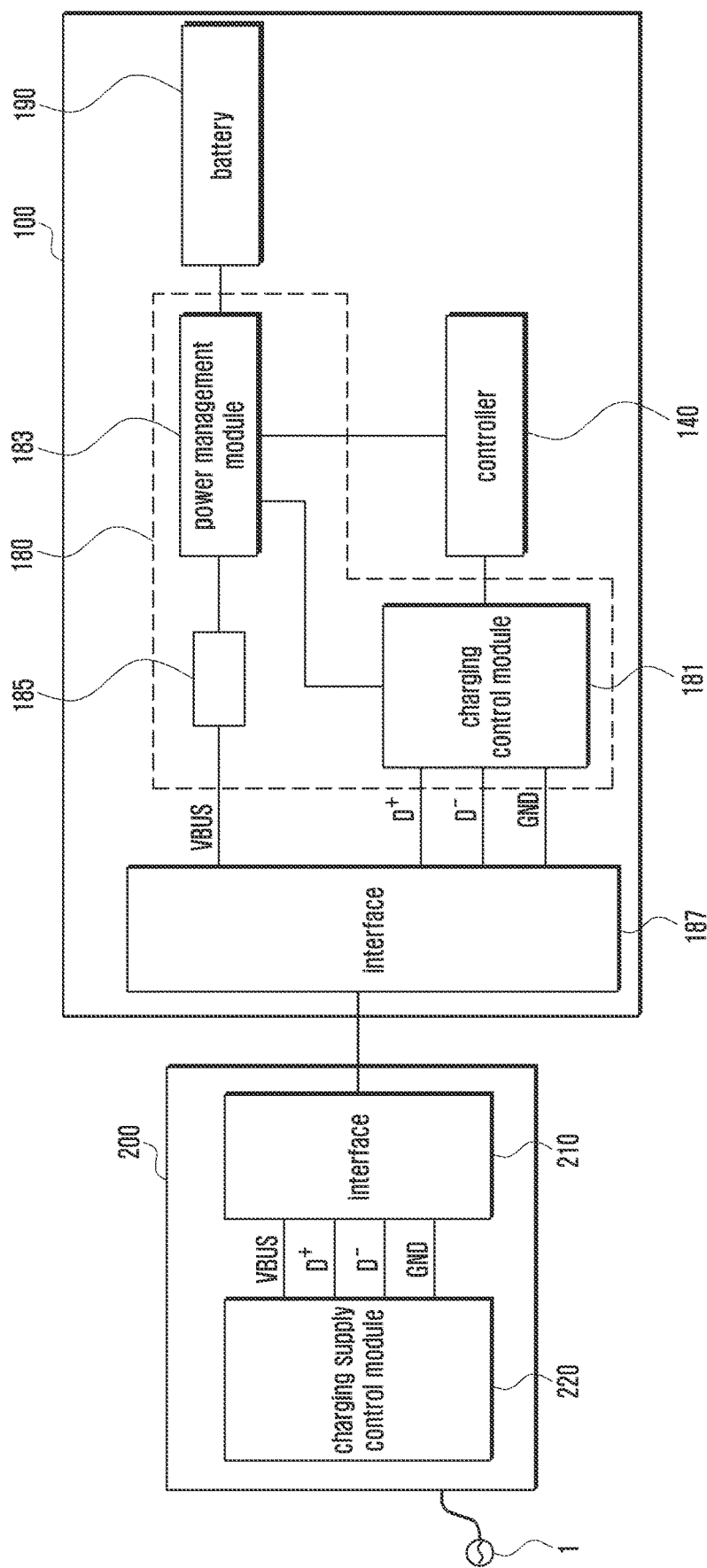
FIG. 2 is a block diagram of a charging system including an electronic device and a power supply device according to an embodiment of the present disclosure.

FIG. 2 is a block diagram of a charging system including an electronic device and an external power supply device according to an embodiment of the present disclosure.

Referring to FIG. 2, the electronic device 100 may include the interface 187, the power management unit 180, the controller 140, and the battery 190.

The interface 187 may be connected to an external power supply device 200. The interface 187 may supply power input from the external power supply device 200 to the electronic device 100.

The power management unit 180 may set a charging mode and control the supplied power to charge the battery 180.

According to an embodiment of the present disclosure, the power management unit 180 may include the charging control module 181, the power management module 183, and the electromagnetic wave shield unit 185 for shielding noise generated by a power supply.

The charging control module 181 or the power management module 183 may manage power of the electronic device 100. Hereinafter, an embodiment in which the charging control module 181 controls the current during communication is described. However, according to various embodiments of the present disclosure, the power management module 183 may control the current, voltage, or power during communication between the electronic device 100 and the external power supply device 200, and, through an interworking between the charging control module 181 and the power management module 183, the current, voltage, or power during charging of the electronic device 100 and the external power supply device 200 may be controlled.

The charging control module 181 may be electrically connected to the interface 187 and a connector which is connected to the interface 187. The charging control module 181 may perform communication with an IC of the external power supply device. The IC of the external power supply device 200 may be a module for controlling power supply of the IC (for example, the charging supply control module 220). The charging control module 181 may make a control to receive the current of a first current value from the external power supply device 200 during at least a part of the communication between the electronic device 100 and the external power supply device 200 through the connector and the interface 187. The charging control module 181 may make a control to receive the current of a second current value greater than the first current value from the external power supply device 200 during at least a part, in which the communication between the electronic device 100 and the external power supply device 200 is not performed, through the connector and the interface 187.

According to an embodiment of the present disclosure, after the electronic device 100 is connected to the external power supply device 200, the charging control module 181 may control the connector or the interface 187 to receive the current of the second current value from the external power supply device 200 during a first period and to receive the current of the first current value during a second period after the first period. The charging control module 181 may make a control to receive the current of a third current value, which is greater than the first current value, from the external power supply device 200 through the connector or the interface 187 during a third period after the second period. The third current value may be less than the second current value. For example, the charging control module 181 may control the connector or the interface 187 to receive the current of the second current value from the external power supply device 200 during the first period after the electronic device 100 is connected to the external power supply device 200. The charging control module 181 may make a control to receive the current of the first current value less than the second current value during the second period in which the electronic device 100 and the external power supply device 200 communicate with each other after the first period. The charging control module 181 may make a control to receive the current of a third current value, which is greater than the first current value and less than the second current value, during a third period after the second period in which the power is supplied according to the charging mode after communication.

According to an embodiment of the present disclosure, the charging control module 181 may detect impedance of an element (for example, the charging supply control module 220) inside the external power supply device 200 after the electronic device 100 is connected to the external power supply device 200. The charging control module 181 may perform communication based on at least a part of the detected impedance. The charging control module 181 may perform the communication between the electronic device 100 and the external power supply device 200 by transmitting/receiving a signal based on the detected impedance.

According to an embodiment of the present disclosure, the charging control module 181 may exchange information related to a voltage value and/or a certain current value required by the electronic device 100 with the IC (for example, the charging supply control module 220) of the external power supply device 200 through communication.

According to an embodiment of the present disclosure, the charging control module 181 may set the quick charging mode or the normal charging mode according to whether the external power supply device 200 supports the quick charging.

The charging control module 181 may receive information on an ID, type, or model of the external power supply device 200 from the connected external power supply device 200. The charging control module 181 may determine whether the external power supply device 200 supports the quick charging mode by using the received information. When the external power supply device 200 supports the quick charging mode, the charging control module 181 may set the charging mode as the quick charging mode.

According to an embodiment of the present disclosure, the charging control module 181 may set or change the charging mode according to a mode setting input received from the user. The charging control module 181 may activate or deactivate the quick charging mode according to the user input received from the user.

According to an embodiment of the present disclosure, the charging control module 181 may determine whether the connected external power supply device 200 supports the quick charging mode. The charging control module 181 may determine whether the external power supply device 200 supports the quick charging of the electronic device 100 according to a signal received from the external power supply device 200 through the D+ line and the D− line. For example, the external power supply device 200 may transmit the signal of the D+ line and the D− line having different particular values (for example, voltage values) according to whether the external power supply device 200 supports the quick charging mode. Accordingly, based on the signal of the D+ line and the D− line received from the external power supply device 200, the charging control module 181 may determine whether the external power supply device 200 is a power supply device that supports the quick charging or a power supply device that does not support the quick charging.

According to an embodiment of the present disclosure, the charging control module 181 may transmit a first charging power value for the quick charging to the external power supply device 200. In this case, when the charging control module 181 receives an acknowledge message from the external power supply device 200, the external power supply device 200 may set a charging mode as the quick charging mode. For example, when the charging control module 181 transmits the first charging power value to the external power supply device 200, the charging control module 181 may receive a signal identical to the transmitted signal from the external power supply device 200 as the acknowledge message. In this case, the charging control module 181 may determine that the external power supply device 200 supports the quick charging mode and supply power corresponding to the transmitted first charging power value through the acknowledge message. In this case, the charging control module 181 may control the battery to be charged in the quick charging mode by transmitting the first charging power value to the external power supply device 200 again.

The charging control module 181 may set a charging power value and transmit the set charging power value to the external power supply device 200. The charging control module 181 may control to transmit the charging power value through communication with the external power supply device 200 and to receive power corresponding to the transmitted charging power value from the external power supply device 200. For example, the charging control module 181 may make a control to transmit a greater charging voltage value compared to the normal charging to the external power supply device 200 and thus receive greater power corresponding to the charging voltage value from the external power supply device 200. The charging control module 181 may control the electronic device 100 to receive power corresponding to a relatively large first charging power value from the external power supply device 200 in the quick charging mode and to receive power corresponding to a second charging power value less than the first charging power value in the normal charging mode. In this case, the charging control module 181 may determine whether power corresponding to the set charging power value is supplied from the external power supply device.

According to an embodiment of the present disclosure, the charging control module 181 may limit the power supplied from the external power supply device 200 to a certain value or less during the communication between the electronic device 100 and the external power supply device 200. For example, the charging control module 181 may limit the voltage and current of the supplied power to a certain value during the communication between the electronic device 100 and the external power supply device 200.

According to an embodiment of the present disclosure, when the power supplied from the external power supply device 200 does not correspond to the preset and transmitted charging power value, the charging control module 181 may initialize and reset the charging mode.

When the power supplied from the external power supply device 200 does not correspond to the set and transmitted charging power value, the charging control module 181 may determine that there is an error in the communication with the external power supply device 200 or the system (for example, at least one of the components of the electronic device). According to an embodiment of the present disclosure, the charging control module 181 may force a positive line (D+ line) of the interface connected to the external power supply device 200 to drop from high to low in order to perform re-communication with the external power supply device 200. In this case, the positive line and a negative line (D− line) of the interface short-circuit. Thereafter, an interrupt is removed and a communication state with the external power supply device 200 may be initialized while the negative line temporarily becomes high and then operates in low.

According to an embodiment of the present disclosure, when the voltage of the external power supply device 200 becomes less than a preset value, the charging control module 181 may initialize the charging mode and setting and reattempt the charging.

According to an embodiment of the present disclosure, when power is supplied from the external power supply device 200, a fold-back phenomenon may occur in which the voltage of the VBUS switches to a second voltage less than a first voltage for the quick charging. In this case, the charging control module 181 may initialize and reset the charging mode.

According to an embodiment of the present disclosure, the charging control module 181 may determine whether a particular function of the electronic device 100 is performed in the quick charging mode. When the particular function is performed, the charging control module 181 may change the charging mode from the quick charging mode to the normal charging mode. According to an embodiment of the present disclosure, when a particular user function is performed in the quick charging mode, the charging control module 181 may stop charging the battery 190 for a certain time. When the particular user function is performed in the quick charging mode, the charging control module 181 may limit a charging power value to a certain value or less while maintaining the charging mode. In another example, the charging control module 181 may determine whether the screen of the electronic device 100 is turned off. The charging control module 181 may make a control to conduct the quick charging only when the screen of the electronic device 100 is turned off.

The power management module 183 may include a PMIC, and a charger IC. For example, the PMIC may be mounted within, for example, an integrated circuit or an SoC semiconductor. The charging methods may be classified into wired charging and wireless charging. The charger IC may charge the battery 190 and prevent introduction of over-voltage or over-current from a charger. According to one embodiment of the present disclosure, the charger IC may include a charger IC for at least one of the wired charging method and the wireless charging method. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like, may be added. According to various embodiments of the present disclosure, the PMIC or the charger IC may include an electromagnetic wave shielding device for shielding an electromagnetic wave around the PMIC or the charger IC. For example, the power management module 183 (for example, the PMIC or the charger IC) may include a shield can in a frame form.

According to an embodiment of the present disclosure, the power management module 183 may control power supplied through the interface 187 or power input into/output to the battery 190 based on the set charging mode. The power management module 183 may determine whether power corresponding to the set charging power value is supplied from the external power supply device.

The electromagnetic wave shield unit 185 may be connected to the interface and the power management module 183 on a VBUS line. The electromagnetic wave shield unit 185 may include at least one beads or a filter. The electromagnetic wave shield unit 185 may shield noise generated by a power supply. The electromagnetic wave shield unit 185 may reduce electromagnetic interference (EMI) noise which may be generated according to a charging operation of the battery 190 of the electronic device. The electromagnetic wave shield unit 185 is not a necessary component of the electronic device 100 and may be omitted.

The controller 140 may control a plurality of hardware components (for example, the display unit 110, the input unit 120, the sensor unit 130, the communication unit 150, and the storage unit 160) or software components by driving an operating system or an application program, and perform processing of various types of data including multimedia data and calculations. More particularly, the controller 140 may control the charging and other functions performed by the electronic device 100 by controlling the general operation of the electronic device 100 and the operation of the power management unit and the interface. According to an embodiment of the present disclosure, the controller 140 may be an AP or a CP.

The battery 190 may store or generate electricity and may supply power to the electronic device 100 by using the stored or generated electricity.

The external power supply device 200 may include an interface 210 and a charging supply control module 220. The external power supply device 200 according to various embodiments of the present disclosure may support at least one charging modes (for example, the quick charging mode or the normal charging mode). The external power supply device 200 may be connected to an external power supply 1. The external power supply 1 may be an AC power supply. The external power supply device 200 may convert power supplied from the external power supply and supply the power to the connected electronic device 100 through the interface 210.

The external power supply device 200 may include an IC that communicates with the electronic device 100. The IC of the external power supply device 200 may control power supply according to the charging mode based on the communication with the electronic device 100. The IC of the external power supply device 200 may include at least one modules. According to an embodiment of the present disclosure, the IC of the external power supply device 200 may be the charging supply control module 220.

The interface 210 may be connected to an external electronic device and may supply power to the external electronic device. The interface 210 may include, for example, a HDMI, an USB, an optical interface, or a D-sub. The interface 210 may include, for example, a MHL interface, an SD card/MMC interface, or an IrDA interface.

The charging supply control module 220 may communicate with the electronic device 100. The charging supply control module 220 may make a control to supply the current of a first current value to the electronic device 100 during at least a part of the communication between the electronic device 100 and the external power supply device 200 and to supply the current of a second current value greater than the first current value to the electronic device 100 during at least a part in which the communication is not performed.

According to an embodiment of the present disclosure, the charging supply control module 220 may make a control to receive a charging power value from the electronic device 100 and to supply power corresponding to the charging power value to the electronic device 100. When a charging power value including a particular voltage value is received from the electronic device 100, the charging supply control module 220 may determine whether the charging supply control module 220 can supply the power corresponding to the charging power value. When the power corresponding to the received charging power value can be supplied, the charging supply control module 220 may transmit an acknowledge message to the electronic device 100. For example, the charging supply control module 220 may transmit a signal having a value identical to the received charging power value to the electronic device 100 as the acknowledge message. According to an embodiment of the present disclosure, when the charging supply control module 220 receives the charging power value again from the electronic device 100 in response to the acknowledge message, the charging supply control module 220 may make a control to supply power corresponding to the received charging power value to the electronic device 100.

According to an embodiment of the present disclosure, the charging supply control module 220 and the charging control module 181 of the electronic device 100 may be implemented as the same modules for controlling the quick charging. According to an embodiment of the present disclosure, the charging supply control module 220 and the charging control module 181 may perform all corresponding functions as the same modules according to whether the electronic device 100 or the external power supply device 200 is the side that supplies power or the side that receives the power.

Figure 3:
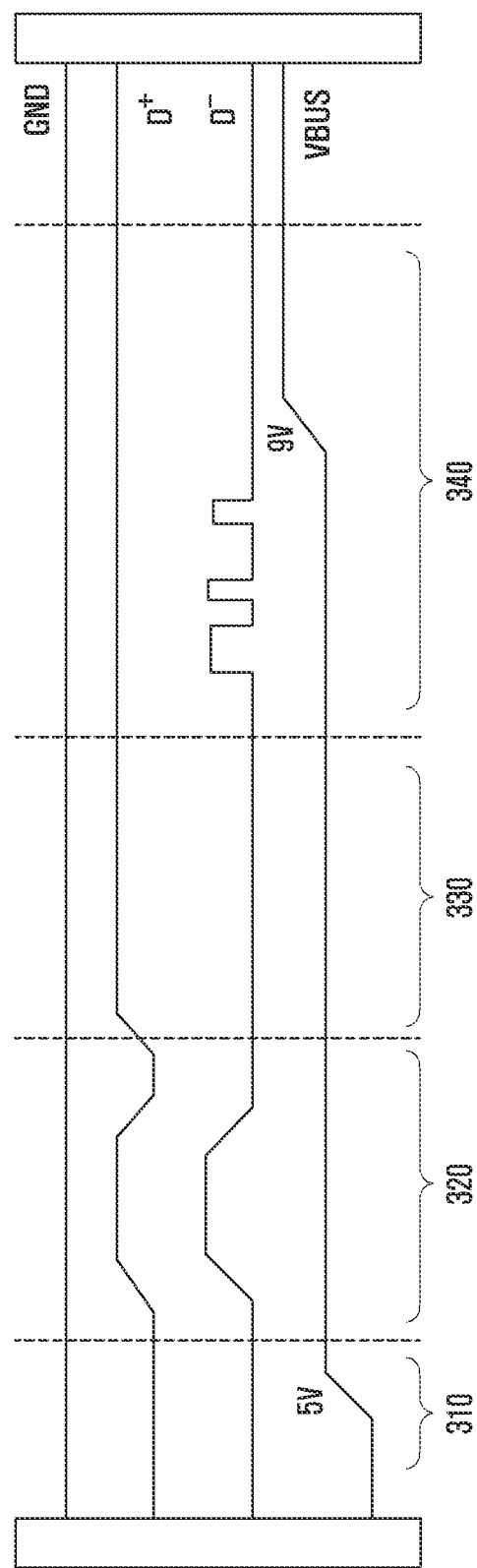
FIG. 3 illustrates signals for controlling charging of an electronic device and a charging control method according to an embodiment of the present disclosure.

FIG. 3 illustrates signals for controlling charging of an electronic device and a charging control method according to an embodiment of the present disclosure.

Referring to FIG. 3, a timing diagram of signals which the electronic device 100 and the external power supply device 200 transmit to control the charging is illustrated, which shows changes in the signals according to a chronological sequence.

Referring to FIG. 3, GND refers to a ground line, D+ refers to a positive line, D− refers to a negative line, and VBUS refers to a power line.

According to an embodiment of the present disclosure, the electronic device 100 is connected to the external power supply device 200 in an interval 310. When the electronic device 100 is connected to the external power supply device 200, the electronic device 100 may receive power (for example, power of 5 V) from the external power supply device 200 through the VBUS line. According to an embodiment of the present disclosure, when the power is supplied from the external power supply device 200 through the VBUS line, the electronic device 100 may determine that the external power supply device 200 is connected to the electronic device 100. According to an embodiment of the present disclosure, when a change in a signal of the D+ line and the D− line starts, the electronic device 100 may determine that the external power supply device 200 is connected to the electronic device 100.

The electronic device 100 may receive a particular signal from the external power supply device 200 through the D+ line and the D− line in an interval 320. The electronic device 100 may determine a type of the external power supply device 200 based on the signal received from the external power supply device 200. The electronic device 100 may determine whether the connected external device is a power supply device for supplying power or a device for another purpose according to the signal received from the external power supply device 200 through the D+ line and the D− line. For example, the electronic device 100 may determine whether the external device connected through the interface 187 is a device only for the charging or a device for both the data communication and the charging. According to an embodiment of the present disclosure, the electronic device 100 may determine whether the external device connected to the interface is a dedicated charging port (DCP) or a standard downstream port (SDP) based on the signal received from the external power supply device 200. For example, the electronic device 100 may determine whether the connection of the external power supply device 200 is a DCP connection for the quick charging (or fast charging) or an SDP connection for both the data communication and the charging.

According to an embodiment of the present disclosure, the electronic device 100 may detect a change in the signal of the D+ line and the D− line from low to high. In this case, the electronic device 100 may detect a change in the signal of the D+ line and the D− line from low to high and determine that the external power supply device 200 is the power supply device. Thereafter, the signal of the D+ line may remain in high after a certain time from the change in the signal from high to low. The signal of the D− line may maintain the low state after the change in the signal from high to low. According to an embodiment of the present disclosure, when the signal of the D+ line becomes low, the D+ line and a D− line instantaneously short-circuit. Thereafter, an interrupt is removed and the state may be reset to an initial state for communication between the electronic device 100 and the external power supply device 200 while the D− line temporarily becomes high and then operates in low.

The electronic device 100 may detect the connection of the external power supply device 200 and prepare communication with the external power supply device 200 in an interval 330.

When the connected external power supply device 200 supports the quick charging mode, the electronic device 100 may determine a power value which can be supplied by the external power supply device 200 in an interval 340. For example, the electronic device 100 may transmit the charging power value by controlling the signal of the D− line while maintaining the signal of the D+ line in the high state. Thereafter, the external power supply device 200 may transmit an acknowledge message to the electronic device 100 in the same way. For example, the external power supply device 200 may transmit a signal identical to the received charging power value to the electronic device 100 as the acknowledge message.

According to an embodiment of the present disclosure, when the signal identical to the transmitted charging power value from the power supply device is received, the electronic device 100 may determine that the external power supply device 200 can supply the transmitted charging power value in the quick charging mode. For example, the electronic device 100 may transmit a charging power value including a voltage value of 20 V to the external power supply device 200. In this case, when power supply of 20 V is not supported, the external power supply device 200 may not transmit the acknowledge message. Alternatively, the external power supply device 200 may transmit a signal indicating that the power supply of the corresponding voltage is not supported to the electronic device 100. When the electronic device 100 transmits the charging power value including a voltage value of 12 V to the external power supply device 200, if the power supply of 12 V is supported, the external power supply device 200 may transmit a signal having the same value as the received charging power value to the electronic device 100 as the acknowledge message. In this case, the electronic device 100 may identify that the external power supply device 200 supports the power supply of 12 V according to the received acknowledge message and receive power corresponding to the charging power value of 12 V from the external power supply device 200.

According to an embodiment of the present disclosure, when it is determined that the external power supply device 200 can supply the power corresponding to the corresponding charging power value, the electronic device 100 may transmit the same charging power value once again. In the interval 340, the external power supply device 200 may start supplying the power corresponding to the charging power value received from the electronic device 100 to the electronic device 100. For example, the external power supply device 200 may change the power of 5 V supplied to the electronic device 100 into the power of 9 V through the VBUS.

After the interval 340, the electronic device 100 may receive higher power from the external power supply device 200 in the quick charging mod compared to the normal charging mode and thus charge the battery quickly.

According to various embodiments of the present disclosure, the electronic device 100 may receive the current of a first current value from the external power supply device 200 during the communication with the external power supply device 200 and receive the current of a second current value greater than the first current value during a period in which the communication is not performed. The electronic device 100 may receive the current of the second current value from the external power supply device 200 during a first period after the external power supply device 200 is connected, receive the current of the first current value during a second period after the first period, and receive the current of a third current value, which is greater than the first current value and less than the second current value, during a third period after the second period. For example, the electronic device 100 may receive the current of the second current value from the external power supply device 200 in the interval 310, receive the current of the first current value in the intervals 320 to 340 in which the communication with the external power supply device 200 is performed, and receive the current of the third current value in intervals after the interval 340. However, according to various embodiments of the present disclosure, intervals in which the current value changes are not limited to the above intervals, and other intervals may be set according to an embodiment.

Figure 4:
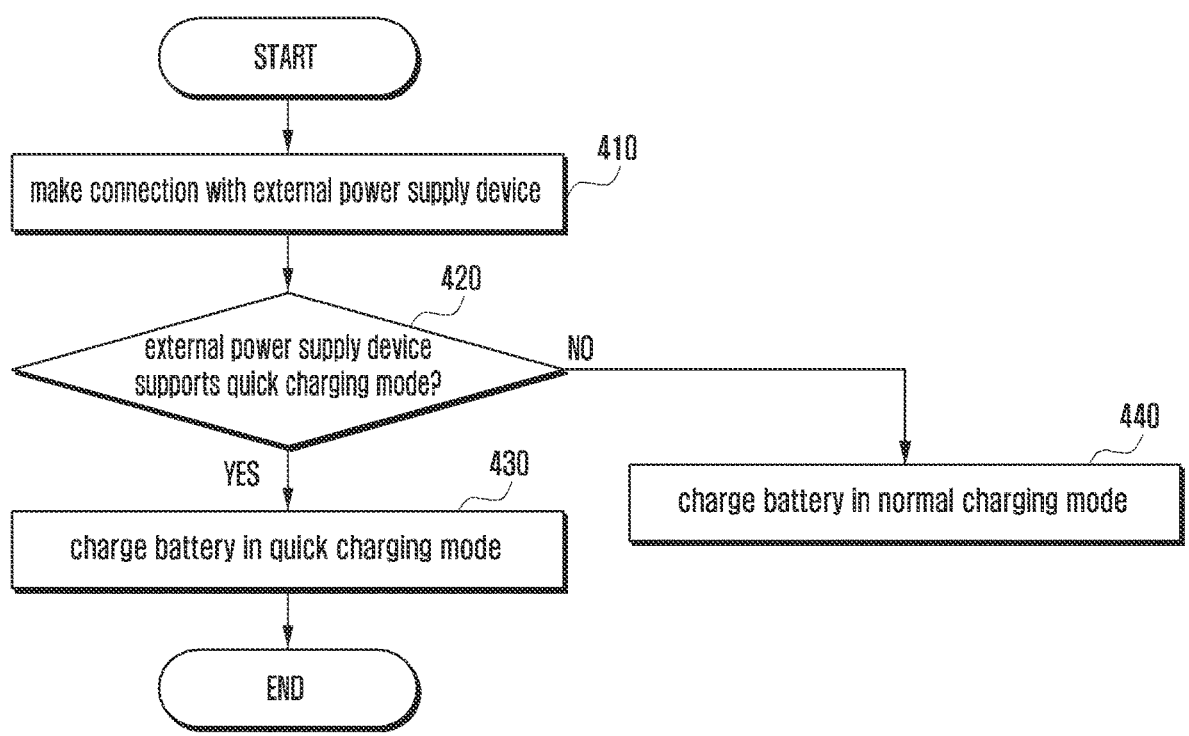
FIG. 4 is a flowchart illustrating a charging control method of an electronic device according to an embodiment of the present disclosure.

FIG. 4 is a flowchart illustrating a charging control method of an electronic device according to various embodiments of the present disclosure.

Referring to FIG. 4, in operation 410, the electronic device 100 may detect a connection of the external power supply device 200. For example, when the external power supply device 200 is connected, the electronic device 100 may receive a signal from the external power supply device 200 to detect the connection. The electronic device 100 may detect the connection of the external power supply device 200 through the detection of power supply from the external power supply device 200.

According to an embodiment of the present disclosure, when the external power supply device 200 is connected, the electronic device 100 may initialize the charging mode setting in order to initialize a communication environment with the external power supply device 200. According to an embodiment of the present disclosure, when the external power supply device 200 is connected, the electronic device 100 may limit the current received from the external power supply device 200 to a preset value before the charging mode is set. For example, when the electronic device 100 receives power of 1.8 A in the normal charging mode and receives power of 1.67 A in the quick charging mode, the electronic device 100 may limit the received current to a low value of 1 A for a certain time after the external power supply device 200 is connected in operation 410.

In operation 420, the electronic device 100 may determine whether the external power supply device 200 supports at least two charging modes (for example, the quick charging mode or the normal charging mode). The electronic device 100 may determine whether the external power supply device 200 supports the quick charging mode. The quick charging mode may be a mode in which the external power supply device 200 supplies power to the electronic device 100 by using a charging voltage greater than the normal charging voltage or a charging current less than the normal charging current. For example, the external power supply device 200, which supports the quick charging mode, may communicate with the electronic device 100. For example, the external power supply device 200 may receive a charging current value, a charging voltage value, or a charging power value from the electronic device 100 and supply power corresponding thereto. The electronic device 100 may receive information on an ID, type, or model of the external power supply device 200 from the connected external power supply device 200. According to an embodiment of the present disclosure, the electronic device 100 may determine whether the connected external device is a power supply device or a device for another purpose based on the received information. The electronic device 100 may determine whether the external power supply device 200 supports the quick charging mode based on the received information.

According to an embodiment of the present disclosure, the electronic device 100 may transmit a first charging power value for the quick charging to the external power supply device 200. The electronic device 100 may receive an acknowledge message from the external power supply device 200 in response to the transmitted first charging power value. The acknowledge message may be a signal having the same value as the first charging power value. The electronic device 100 may determine whether the external power supply device 200 supports the quick charging mode or the external power supply device 200 can supply power corresponding to the transmitted first charging power value based on the acknowledge message received from the external power supply device 200.

According to an embodiment of the present disclosure, in operation 420, the electronic device 100 may communicate with the external power supply device 200 by using the current of a less current value than that in operation 410.

When the external power supply device 200 supports the quick charging mode, the electronic device 100 may perform operation 430. When the external power supply device 200 does not support the quick charging mode, the electronic device 100 may perform operation 440.

In operation 430, the electronic device 100 may charge the battery 190 in the quick charging mode. For the quick charging, the electronic device 100 may transmit the first charging power value greater than the second charging power value, which is received in the normal charging mode, to the external power supply device 200. The electronic device 100 may receive power corresponding to the transmitted first charging power value from the external power supply device 200 and charge the battery 190 quickly.

According to various embodiments of the present disclosure, the electronic device 100 may display a screen for selecting a charging mode from the user in operation 430. For example, the electronic device 100 may display the screen for selecting the charging mode in the entire area of the display unit 110 or display a popup window for selecting the charging mode. For example, when the external power supply device 200 is connected, the electronic device 100 may display the screen for selecting the charging mode including a message of "Do you want quick charging?". The electronic device 100 may receive a mode selection input from the user. The electronic device 100 may set the charging mode according to the mode selection input of the user. For example, when the electronic device 100 receives a mode selection input for the normal charging mode from the user, the battery 190 may be charged in the normal charging mode although the connected external power supply device 200 supports the quick charging mode.

According to an embodiment of the present disclosure, the electronic device 100 may control the charging to be performed in the quick charging mode only in a state where the screen of the display unit 110 of the electronic device 100 is turned off. For example, the electronic device 100 may charge the battery 190 in the quick charging mode in the state where the screen is turned off and charge the battery 190 in the normal charging mode in a state where the screen is turned on.

According to an embodiment of the present disclosure, the electronic device 100 may receive the current greater than the current during the communication in operation 420 from the external power supply device 200 while the electronic device 100 does not communicate with the external power supply device 200 (for example, while only the charging is performed).

In operation 440, the electronic device 100 may charge the battery 190 in the normal charging mode. The normal charging mode may be a mode in which the battery 190 is charged according to a preset second charging power value. For example, the electronic device 100 may receive power corresponding to a preset rated voltage value or rated current value from the external power supply device 200.

According to an embodiment of the present disclosure, the electronic device 100 may display a user interface which displays a charging mode and a degree of the charging of the battery 190 during the charging. For example, the user interface may be a dynamically varying user interface having different change speeds according to the charging mode.

According to an embodiment of the present disclosure, the electronic device 100 may make a control to receive the current of a first current value from the external power supply device 200 during at least a part of the communication in which the electronic device 100 exchanges a particular signal or information with the external power supply device 200 and to receive the current of a second current value greater than the first current value from the external power supply device 200 during at least a part in which the communication is not performed. For example, the electronic device 100 may transmit/receive a signal to/from the external power supply device 200 by using the current of the first current value during the communication and transmit/receive a signal or power by using the current of the second current value greater than the first current value during the part in which the communication is not performed.

Figure 5:
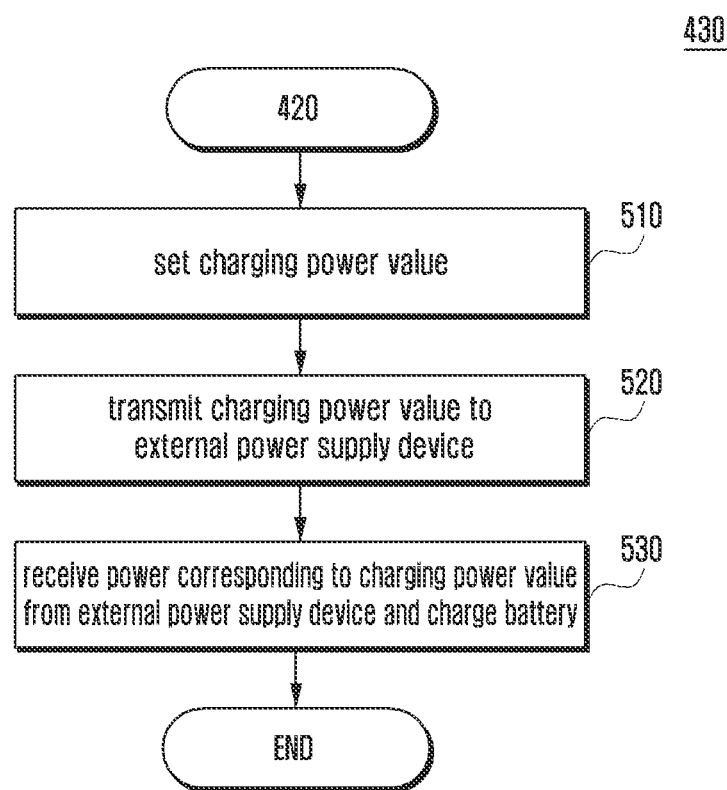
FIG. 5 is a flowchart illustrating an operation in a quick charging mode in a charging control method of an electronic device according to various embodiments of the present disclosure.

FIG. 5 is a flowchart illustrating an operation in a quick charging mode in a charging control method of an electronic device according to various embodiments of the present disclosure.

Referring to FIG. 5, in operation 510, the electronic device 100 may set a charging power value (a charging current value or a charging voltage value). The charging power value may be a set value of the size of power to be supplied when the power is supplied from the external power supply device 200. For example, the electronic device 100 may set the power to be supplied from the external power supply device 200 as 15 W (9 V and 1.67 A) in the quick charging mode and set the power as 10 W (5.3 V and 2 A) in the normal charging mode. For the quick charging, the electronic device 100 may set, as the charging power value, a voltage value greater than the rated voltage which is generally used and a certain current value less than the rated current to quickly charge the battery 190. According to an embodiment of the present disclosure, the electronic device 100 may receive higher power by using the relatively high voltage and low current in the quick charging, and thus prevent an IR drop which may be generated in a process in which the power is transferred from the external power supply device 200 to the battery charging IC.

In operation 520, the electronic device 100 may transmit the charging power value to the external power supply device 200. The electronic device 100 may transmit the charging power value to the external power supply device 200 through the interface 187. The electronic device 100 may transmit the charging power value to the external power supply device 200 through the communication unit 150 in a wired or wireless manner. According to an embodiment of the present disclosure, the electronic device 100 may control power supplied with the second charging power value less than the first charging power value used in the quick charging while the electronic device 100 communicates with the external power supply device 200. For example, the electronic device 100 may prevent a communication malfunction by limiting the current to be supplied to a certain value or less while the electronic device 100 communicates with the external power supply device 200.

In operation 530, the electronic device 100 may receive power corresponding to the charging power value from the external power supply device 200. The electronic device 100 may determine whether the power supplied from the external power supply device 200 corresponds to the charging power value. For example, the electronic device 100 may determine whether the power supplied from the external power supply device 200 corresponds to the charging power value. When the power supplied from the external power supply device 200 is different from the transmitted charging power value by a certain reference, the electronic device 100 may transmit the desired charging power value to the external power supply device 200 again. When the power supplied from the external power supply device 200 is still different from the charging power value, the electronic device 100 may initialize and reset the setting of the charging mode. For example, when it is determined that there is an error in the supplied power, the electronic device 100 may stop the charging and initialize all settings, and reattempt the charging operation.

Figure 6:
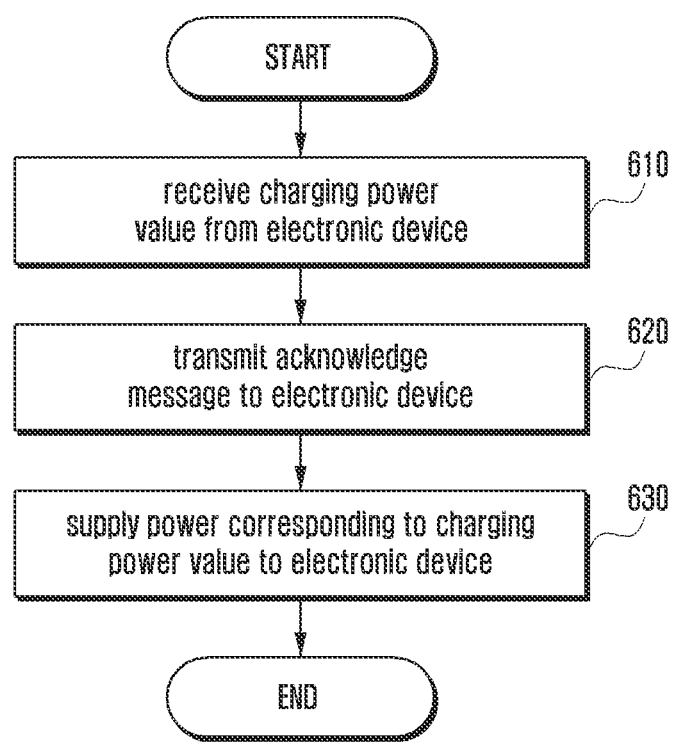
FIG. 6 is a flowchart illustrating a method of supplying power by an external power supply device according to an embodiment of the present disclosure.

FIG. 6 is a flowchart illustrating a method of supplying power by an external power supply device according to various embodiments of the present disclosure. The external power supply device 200 refers to the external power supply device 200 which can be connected to the electronic device 100.

Referring to FIG. 6, in operation 610, the external power supply device 200 may be connected to the electronic device 100 through the interface. When the external power supply device 200 is connected to the electronic device, the external power supply device 200 may provide power supplied through the external power supply to the electronic device 100 through the VBUS. The external power supply device 200 may supply power to the electronic device 100 as a preset rated power value before the external power supply device 200 receives a charging power value from the electronic device. The external power supply device 200 may receive the charging power value from the connected electronic device. According to various embodiments of the present disclosure, the external power supply device 200 may receive the charging power value from the electronic device 100 in a wired or wireless manner.

When the external power supply device 200 can perform the quick charging mode, the external power supply device 200 may transmit an acknowledge message to the electronic device 100 in operation 620. According to an embodiment of the present disclosure, the external power supply device 200 may transmit a signal having the same value as the received charging power value to the electronic device 100 as the acknowledge message. The external power supply device 200 may receive the charging power value from the electronic device 100 again after transmitting the acknowledge message.

According to an embodiment of the present disclosure, the external power supply device 200 may determine whether the external power supply device 200 can supply power corresponding to the received charging power value. When the external power supply device 200 can supply the power corresponding to the received charging power value, the external power supply device 200 may transmit a signal identical to the received charging power value to the electronic device 100 as the acknowledge message. When the external power supply device 200 receives the charging power value again from the electronic device 100 in response to the acknowledge message, the external power supply device 200 may perform operation 630.

In operation 630, the external power supply device 200 may supply power corresponding to the received charging power value to the electronic device. For example, the external power supply device 200 may supply the power corresponding to the charging power value to the electronic device 100 instead of the power supplied according to the existing rated power value or the previously received power charging value.

According to an embodiment of the present disclosure, the external power supply device 200 may supply the current of a first current value to the electronic device 100 during at least a part of the communication in which the external power supply device 200 exchanges a particular signal or information with the electronic device 100 and supply the current of a second current value greater than the first current value during at least a part in which the communication is not performed. For example, the external power supply device 200 may transmit/receive a signal to/from the electronic device 100 by using the current of the first current value during the communication and transmit/receive a signal or power by using the current of the second current value greater than the first current value during the period in which the communication is not performed.

FIG. 7 is a flowchart illustrating a charging control method of an electronic device according to various embodiments of the present disclosure.

Referring to FIG. 7, in operation 710, the electronic device 100 may detect a connection of the external power supply device 200. For example, when the electronic device 100 receives a signal or power from the external power supply device 200, it is determined that the external power supply device 200 is connected to the electronic device 100.

In operation 720, the electronic device 100 may determine whether the external power supply device 200 supports the quick charging mode. When the external power supply device 200 supports the quick charging mode, the electronic device 100 may perform operation 730. When the external power supply device 200 does not support the quick charging mode, the electronic device 100 may perform operation 790.

In operation 730, the electronic device 100 may set the charging mode as the quick charging mode. The electronic device 100 may charge the battery 190 in the quick charging mode. The electronic device 100 may transmit a first charging power value set for the quick charging to the external power supply device 200. The electronic device 100 may receive power corresponding to the transmitted first charging power value from the external power supply device 200 and charge the battery 190.

In operation 740, the electronic device 100 may determine whether the electronic device 100 malfunctions. For example, the electronic device 100 may detect the malfunction of the system (for example, at least one of the components of the electronic device 100). For example, when the electronic device 100 overloads the system or stops the operation, the electronic device 100 may detect a bad connection of the connector or the interface 187 due to foreign substances, a short circuit due to moisture, corrosion, or a bad connection due to connector separation. When the malfunction of the system is detected, the electronic device 100 may perform operation 750. When no malfunction of the system is detected, the electronic device 100 may perform operation 760.

In operation 750, the electronic device 100 may initialize the charging mode setting. For example, the electronic device 100 may stop the charging and initialize the charging mode setting. According to an embodiment of the present disclosure, the electronic device 100 may stop the charging and end all functions being used. After initializing the setting, the electronic device 100 may perform a function of charging the battery 190 again starting from operation 720. According to an embodiment of the present disclosure, when it is determined that the charging of the battery in the quick charging mode is not possible due to the generation of repeated system errors or other errors (for example, the system overload, the operation stoppage, the bad connection of the connector or the interface 187 due to foreign substances, the short circuit due to moisture, corrosion, or the bad connection due to connector separation), the electronic device 100 may charge the battery 190 in the normal charging mode. For example, when the electronic device 100 initializes the charging mode setting repeatedly a preset number of times or more during the charging, the electronic device 100 may charge the battery 190 in the normal charging mode.

In operation 760, the electronic device 100 may determine whether there is an error in power supplied from the external power supply device 200. For example, the electronic device 100 may set the power supplied from the external power supply device 200 in the quick charging mode and compare the power with a transmitted first charging power value. When the supplied power is different from the first charging power value, the electronic device 100 may determine that there is an error in the power supplied from the external power supply device 200. In the quick charging mode, the electronic device 100 may receive relatively large power from the external power supply device 200 and charge the battery 190 quickly. In this case, when the electronic device 100 receives the power different from the set first charging power value, the electronic device 100 may determine that the quick charging has not happened. When it is determined that there is the error in the supplied power, the electronic device 100 may perform operation 750. When it is determined that there is no error in the supplied power, the electronic device 100 may perform operation 770.

In operation 770, the electronic device 100 may determine whether a particular user function is performed. When the particular user function and the quick charging are simultaneously performed, the electronic device 100 may be excessively heated or may be overloaded, or the electronic device 100 or the battery 190 may be damaged. The electronic device 100 may prevent another user function from being performed in the quick charging mode during the charging. For example, when a particular user function is performed in the quick charging mode, the electronic device 100 may perform operation 790. According to an embodiment of the present disclosure, when a particular user function is performed in the quick charging mode, electronic device 100 may stop charging the battery 190 for a certain time. When the particular user function is performed in the quick charging mode, the electronic device 100 may make a control to receive power corresponding to a second charging power value less than a preset first charging power value. For example, when the particular user function is performed while the power corresponding to the first charging power value is supplied, the electronic device 100 may transmit the second charging power value less than the first charging power value to the external power supply device 200. Thereafter, the electronic device 100 may receive power corresponding to the second charging power value from the external power supply device 200 until the performing of the particular user function ends. When the particular user function ends, the electronic device 100 may make a control to receive the power corresponding to the first charging power value again.

For example, the electronic device 100 may determine whether a call function is performed in the quick charging mode during the charging. The electronic device 100 may switch the charging mode from the quick charging mode to the normal charging mode until the call function ends. After the call function ends, the electronic device 100 may switch the charging mode again from the normal charging mode to the quick charging mode.

According to another example, the electronic device 100 may determine whether a message function is performed in the quick charging mode during the charging. The electronic device 100 may switch the charging mode from the quick charging mode to the normal charging mode while the message function is used.

In operation 780, the electronic device 100 may maintain the quick charging mode. The electronic device 100 may charge the battery 190 in the quick charging mode.

In operation 790, the electronic device 100 may charge the battery 190 in the normal charging mode. The normal charging mode may be a mode in which the battery 190 is charged according to a preset rated voltage value or rated current value. For example, the electronic device 100 may receive power corresponding to the preset rated voltage value or rated current value from the external power supply device 200.

Figure 8A:
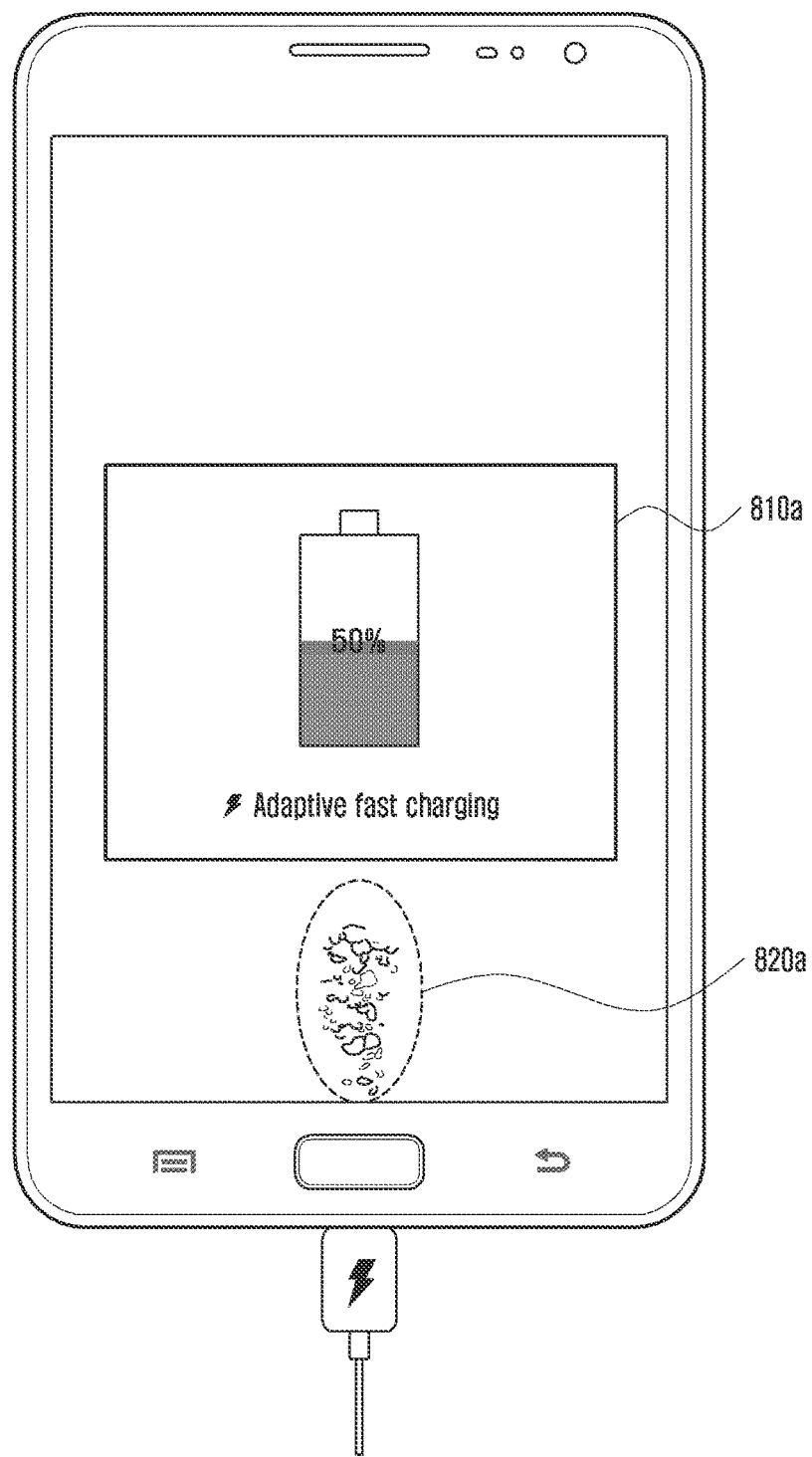
FIGS. 8A, 8B, and 8C illustrate a user interface that displays a charging mode in an electronic device and a charging control method of the electronic device according to an embodiment of the present disclosure.
Figure 8B:
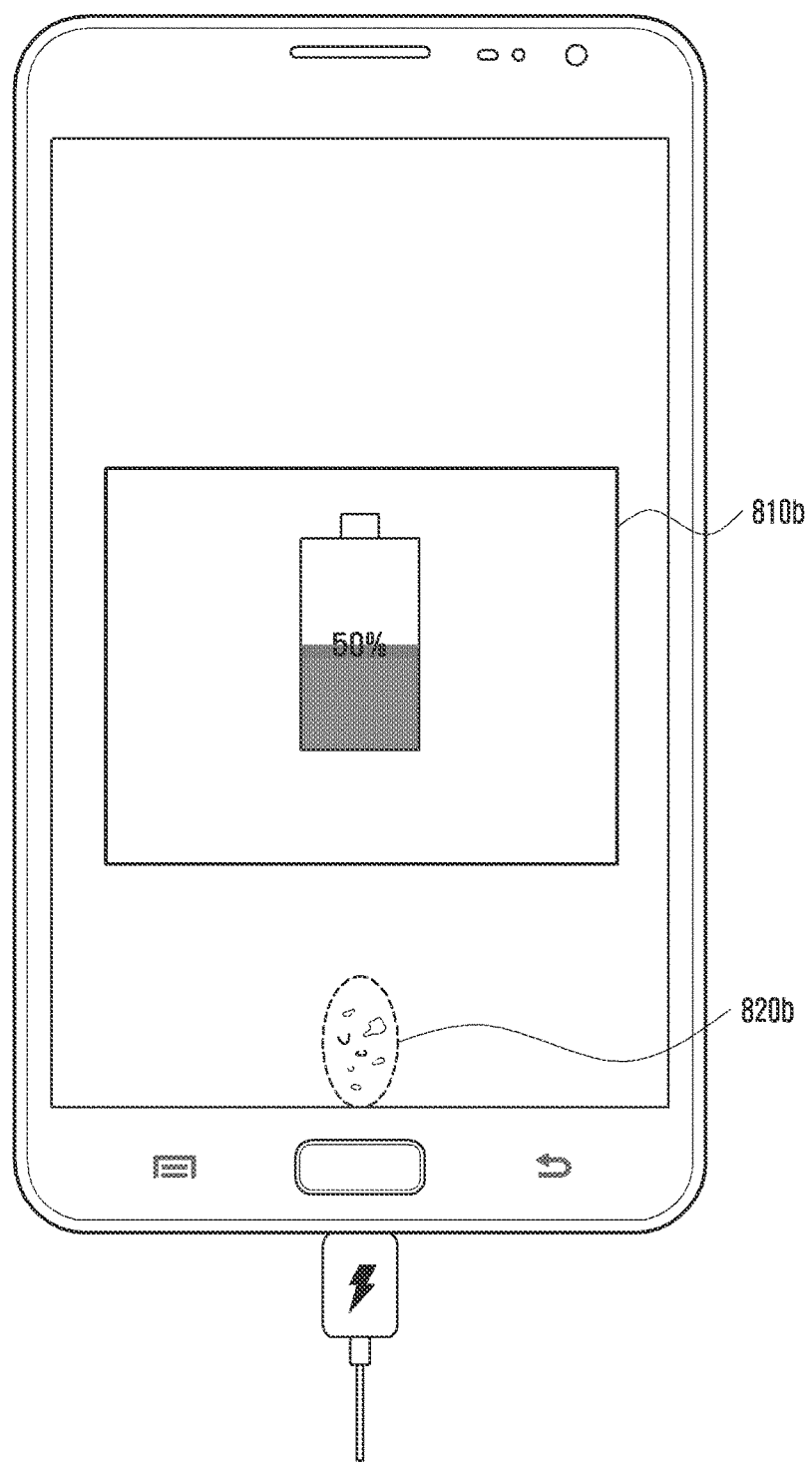
Figure 8C:

FIGS. 8A, 8B, and 8C illustrate a user interface that displays a charging mode in an electronic device and a charging control method of the electronic device according to various embodiments of the present disclosure.

Referring to FIG. 8A, a case where the electronic device 100 (for example, a portable terminal) is charged in the quick charging mode in a state where the electronic device 100 is turned off is illustrated. When the electronic device 100 is charged in the quick charging mode while the electronic device 100 is turned off, the electronic device 100 may display a user interface 810a or 820a indicating that the quick charging is performed. For example, the electronic device 100 may also display a battery picture indicating that the charging is being performed, a value indicating a charging level, and a phrase indicating a charging mode (for example, "quick charging mode" or "adaptive fast charging") 820a.

According to an embodiment of the present disclosure, the electronic device 100 may display a dynamically varying interface 820a, which indicates that the battery is being charged, under the displayed battery indication 810a. For example, the electronic device 100 may display a user interface 820b in which water drops or bubble shapes move in a direction of the battery indication 810b. According to an embodiment of the present disclosure, the dynamically varying interface 820a is not standardized, and may have various different forms (for example, various shapes, sizes, movement directions, movement traces, movement speeds, colors, and the like). The electronic device 100 may display different amounts or movement speeds of the water drops or bubble shapes according to charging mode. For example, the electronic device 100 may allow the user to intuitively determine the charging mode by making the amount or range of the varying user interface 820a greater or making the movement speed of the varying user interface 820a faster in the quick charging mode compared to the normal charging mode.

Referring to FIG. 8B, a case where the electronic device 100 (for example, a portable terminal) is charged in the normal charging mode in a state where the electronic device 100 is turned off is illustrated. When the electronic device 100 is charged in the normal charging mode while the electronic device 100 is turned off, the electronic device 100 may display a user interface 810b or 820b indicating that the normal charging is being performed. For example, the electronic device 100 may display a battery picture 810b indicating a charging level and indicating that the charging is being performed.

According to an embodiment of the present disclosure, the electronic device 100 may display a dynamically varying user interface 820b which indicates that the battery is being charged, under the displayed battery indication 810b. For example, the electronic device 100 may display a user interface 820b in which water drops or bubble shapes move in a direction of the battery indication 810b. Alternatively, the electronic device 100 may not display the varying user interface 820b in the normal charging mode, so as to distinguish the normal charging mode from the quick charging mode.

Referring to FIG. 8C, a case where the electronic device 100 is being charged in a state where the electronic device 100 is turned on is illustrated. The electronic device 100 may display a user interface 810c indicating that the charging is being performed in a state display area on an upper part of the screen while the electronic device 100 is turned on. The electronic device 100 may display the user interface 810c indicating the charging mode. For example, the electronic device 100 may also display a lightning shaped picture indicating that the charging is being performed and a phrase indicating a charging mode (for example, "quick charging mode" or "adaptive fast charging") 810c.

Figure 9:
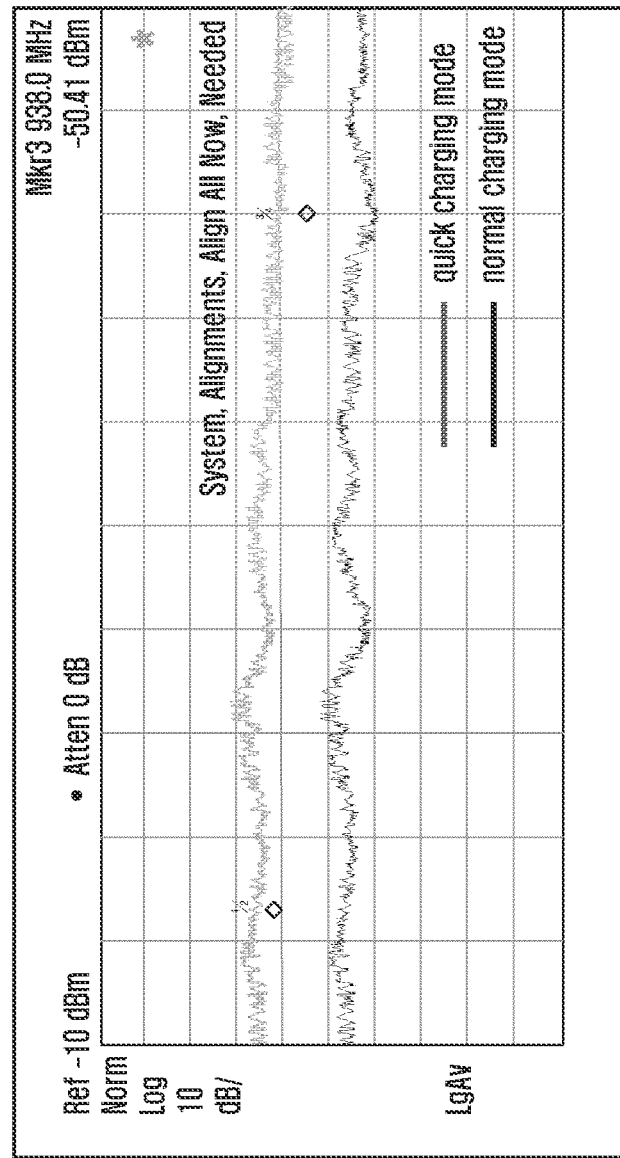
FIG. 9 illustrates a result of a measurement of noise generated in an operation of charging of an electronic device and a charging control method of the electronic device according to an embodiment of the present disclosure.

FIG. 9 illustrates a result of measurement of noise generated an operation of charging an electronic device and a charging control method of the electronic device according to various embodiments of the present disclosure.

Referring to FIG. 9, noise radiation generated when the battery 190 is charged may be different according to the quick charging mode or the normal charging mode based on the electronic device 100 and the charging control method of the electronic device 100. For example, when the electronic device 100 receives high power from the external power supply device 200, greater noise may be generated.

Accordingly, in order to address the above issue, the electronic device 100 according to various embodiments of the present disclosure may include an electromagnetic wave shielding device, such as a shield can, around the power management unit 180 (for example, the power management module 183). Further, the power management unit 180 may include the electromagnetic wave shield unit 185 on a power line that is connected to the power management module 183 to supply power. The electromagnetic wave shield unit 185 may include at least one beads. According to an embodiment of the present disclosure, the electronic device 100 may include an AC filter before and after an input terminal (connection unit) of the interface 187 connected to the external power supply device 200. For example, according to various embodiments of the present disclosure, even when the electronic device 100 is charged with higher power in the quick charging mode, radiated noise and EMI can be reduced.

Figure 10:
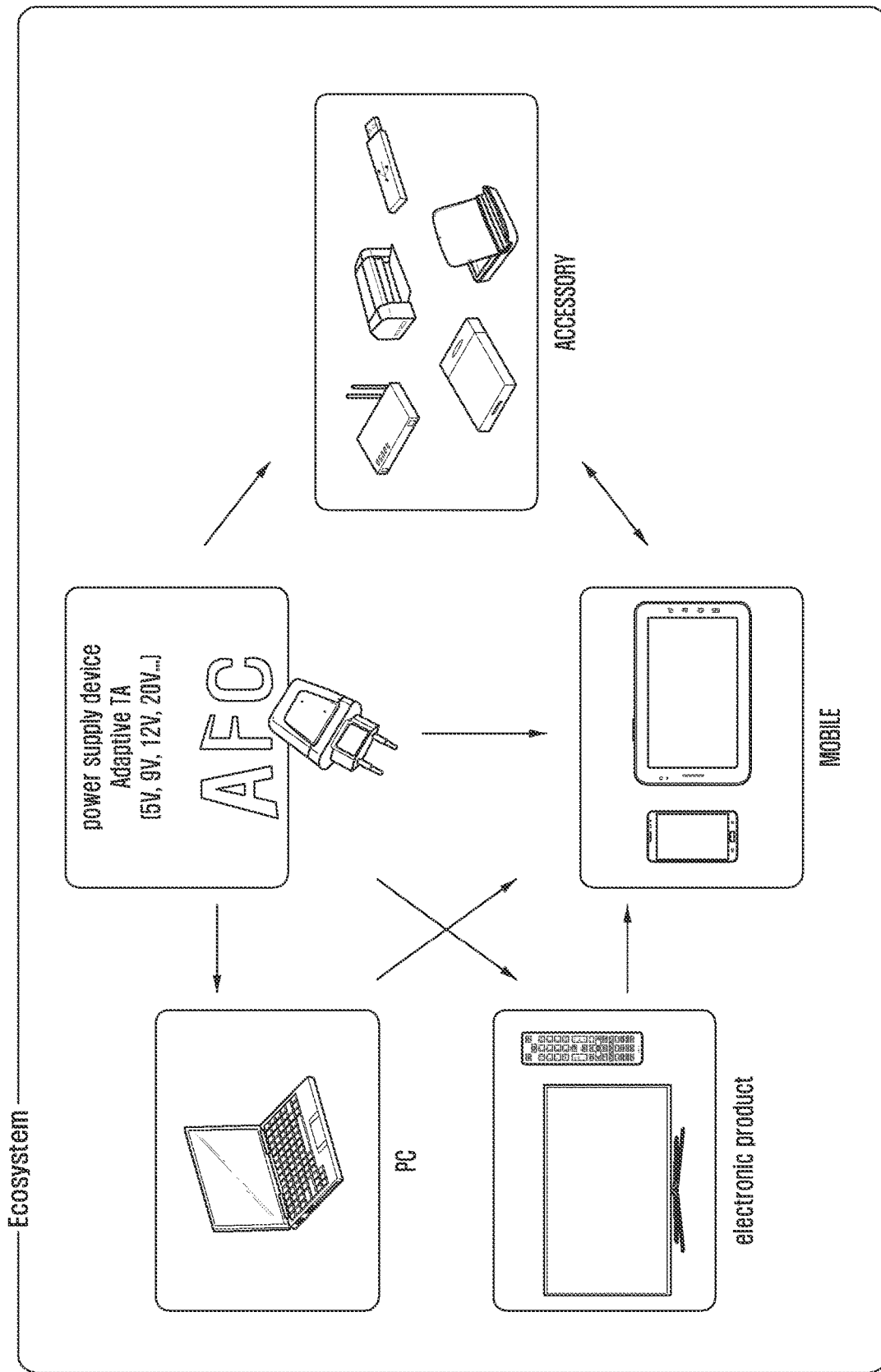
FIG. 10 illustrates a charging system according to various embodiments of the present disclosure.

FIG. 10 illustrates a charging system according to an embodiment of the present disclosure.

Referring to FIG. 10, an example of an eco-system in which various electronic devices interwork with each other according to various embodiments of the present disclosure is illustrated.

According to various embodiments of the present disclosure, the electronic device 100 or the external power supply device 200 may include various electronic devices using power. For example, the electronic device 100 or the external power supply device 200 may be one of various types of electronic devices including an adaptive TA, a tablet, a portable terminal, a personal computer (PC), a television (TV), a remote control, and an electronic accessory (for example, a car charger, a docking station, and the like).

Referring to FIG. 10, the various types of electronic devices may operate as the electronic device 100 or the external power supply device 200 according to various embodiments of the present disclosure. For example, when a PC and a portable terminal are connected to each other, the PC may perform the functions of the external power supply device 200 and the portable terminal may perform the functions of the electronic device 100. When an electronic accessory, such as a car charger, is connected to the portable terminal, the electronic accessory may perform the functions of the external power supply device 200 and the portable terminal may perform the functions of the electronic device 100. According to various embodiments of the present disclosure, various types of electronic devices may interwork with other electronic devices and perform the functions of the electronic device 100 or the external power supply device 200 depending on situations, thereby implementing the charging system including various combinations which supports the quick charging mode.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a touchscreen display;
a processor;
a battery;
a connector configured to be electrically connected with an external power supply device, the connector including a universal serial bus (USB) interface including a D+ line and a D− line; and
charging circuitry electrically connected with the processor and the connector, the charging circuitry configured to:
based at least in part on a determination that the electronic device is connected with the external power supply device via the connector, obtain a first charging power from the external power supply device via the connector, the first charging power having a first voltage and a first current,
after the first charging power is obtained from the external power supply device, receive a second current lower than the first current from the external power supply device via the connector while a communication is performed between the electronic device and the external power supply device via at least one line of the D+ line or the D− line,
after the communication, obtain a second charging power higher than the first charging power from the external power supply device via the connector, the second charging power having a second voltage higher than the first voltage and a third current higher than the second current, and
charge the battery using the second charging power.

2. The electronic device of claim 1, wherein the communication is performed by repeatedly changing a first signal corresponding to a first line of the D+ line and the D− line between a first level and a second level while a second signal corresponding to a second line of the D+ line and the D− line is maintained at a substantially same level.

3. The electronic device of claim 2, wherein the first level corresponds to one state of a high state or a low state and the second state corresponds to another state of the high state or the low state.

4. The electronic device of claim 1, wherein the third current is lower than the first current.

5. The electronic device of claim 1,
wherein the charging circuitry is capable of supporting a plurality of charging modes including a first charging mode corresponding to the first charging power and a second charging mode corresponding to the second charging power, and
wherein the processor is configured to:
transition from the first charging mode to the second charging mode after the first charging power is obtained by the charging circuitry in the first charging mode and before the second charging power is obtained by the charging circuitry in the second charging mode.

6. The electronic device of claim 5, wherein processor is further configured to, based at least in part on a determination that a specified function is performed while the second charging power is obtained from the external power supply device, control the charging circuitry to obtain a third charging power lower than the second charging power from the external power supply device and charge the battery using the third charging power.

7. The electronic device of claim 6, wherein the processor is further configured to:
based at least in part on a determination that the specified function is terminated while the third charging power is obtained from the external power supply device, control the charging circuitry to obtain the second charging power from the external power supply device and charge the battery using the second charging power.

8. The electronic device of claim 6, wherein the specified function includes at least one of a call function, a message function, a game function, or a multimedia reproduction function.

9. The electronic device of claim 1, wherein the processor is configured to:
display, via the touchscreen display, a first user interface corresponding to the first charging mode at least temporarily while the first charging power is obtained, the first user interface including one or more motion graphics and numeric information corresponding to a charging state of the battery, and
display, via the touchscreen display, a second user interface corresponding to the second charging mode at least temporarily while the second charging power is obtained, the second user interface including the one or more motion graphics and the numeric information and an indicator indicative of the second charging mode.

10. A method of controlling charging by an electronic device for receiving power from an external power supply and charging a battery, the method comprising:
based at least in part on a determination that the electronic device is connected with the external power supply device via a connector of the electronic device, obtaining a first charging power from the external power supply device via the connector, the connector including a universal serial bus (USB) interface including a D+ line and a D− line and the first charging power having a first voltage and a first current;
after the first charging power is obtained from the external power supply device, receiving a second current lower than the first current from the external power supply device via the connector while a communication is performed between the electronic device and the external power supply device via at least one line of the D+ line or the D− line;
after the communication, obtaining a second charging power higher than the first charging power from the external power supply device via the connector, the second charging power having a second voltage higher than the first voltage and a third current higher than the second current; and
charging the battery of the electronic device using the second charging power.

11. The method of claim 10, wherein the communication is performed by repeatedly changing a first signal corresponding to a first line of the D+ line and the D− line between a first level and a second level while a second signal corresponding to a second line of the D+ line and the D− line is maintained at a substantially same level.

12. The method of claim 11, wherein the first level corresponds to one state of a high state or a low state and the second state corresponds to another state of the high state or the low state.

13. The method of claim 10, wherein the third current is lower than the first current.

14. The method of claim 10, wherein the electronic device is capable of supporting a plurality of charging modes including a first charging mode corresponding to the first charging power and a second charging mode corresponding to the second charging power, and the method further comprising:
transitioning from the first charging mode to the second charging mode after the first charging power is obtained in the first charging mode and before the second charging power is obtained in the second charging mode.

15. The method of claim 14, further comprising:
based at least in part on a determination that a specified function is performed while the second charging power is obtained from the external power supply device, obtaining a third charging power lower than the second charging power from the external power supply device; and
charging the battery using the third charging power.

16. The method of claim 15, further comprising:
based at least in part on a determination that the specified function is terminated while the third charging power is obtained from the external power supply device, obtaining the second charging power from the external power supply device; and
charging the battery using the second charging power.

17. The method of claim 15, wherein the specified function includes at least one of a call function, a message function, a game function, or a multimedia reproduction function.

18. The method of claim 10, further comprising:
displaying, via a touchscreen display of the electronic device, a first user interface corresponding to the first charging mode at least temporarily while the first charging power is obtained, the first user interface including one or more motion graphics and numeric information corresponding to a charging state of the battery; and
displaying, via the touchscreen display, a second user interface corresponding to the second charging mode at least temporarily while the second charging power is obtained, the second user interface including the one or more motion graphics and the numeric information and an indicator indicative of the second charging mode.

* * * * *